United States Patent
Hyun et al.

(10) Patent No.: US 12,254,201 B2
(45) Date of Patent: Mar. 18, 2025

(54) METHOD FOR USING NAND FLASH MEMORY SRAM IN SOLID STATE DRIVE CONTROLLER

(71) Applicant: Huawei Technologies Co., Ltd., Shenzhen (CN)

(72) Inventors: Jea Woong Hyun, Los Altos, CA (US); Chun Liu, San Jose, CA (US); Chaohong Hu, San Jose, CA (US); Xin Liao, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 17/994,884

(22) Filed: Nov. 28, 2022

(65) Prior Publication Data
US 2023/0152999 A1     May 18, 2023

Related U.S. Application Data

(63) Continuation of application No. PCT/US2020/034644, filed on May 27, 2020.

(51) Int. Cl.
*G06F 3/06*     (2006.01)

(52) U.S. Cl.
CPC ............ *G06F 3/064* (2013.01); *G06F 3/0619* (2013.01); *G06F 3/0679* (2013.01)

(58) Field of Classification Search
CPC ...... G06F 3/0614; G06F 3/0619; G06F 3/064; G06F 3/0679; G06F 12/0246; G06F 12/0868; G06F 12/1408; G06F 2212/1024; G06F 2212/1032; G06F 2212/225; G06F 2212/262; G06F 2212/283;
(Continued)

(56) References Cited

U.S. PATENT DOCUMENTS

| | | | |
|---|---|---|---|
| 2009/0168525 A1 | 7/2009 | Olbrich et al. | |
| 2012/0084484 A1* | 4/2012 | Post ................... | G06F 12/0246 |
| | | | 710/308 |

(Continued)

OTHER PUBLICATIONS

Chang, D-W., et al., "ACM Transactions on Design Automation of Electronic Systems," Association for Computing Machinery, New York, NY, United States, vol. 19, No. 2, ISSN:1084-4309, Mar. 28, 2014, 29 pages.

*Primary Examiner* — Larry T Mackall
(74) *Attorney, Agent, or Firm* — Conley Rose, P.C.

(57) ABSTRACT

Write operation and garbage collection methods are provided for a Solid State Drive (SSD) controller of a SSD having Not-AND (NAND) flash memory devices with on-die Static Random Access Memory (SRAM) and NAND flash memory. In the write operation method, a received block of data is stored in on-die SRAM of the NAND flash device, rather than in on-chip SRAM of the controller, prior to programming into NAND flash memory. Until programmed into NAND flash memory, the block of data remains available in the on-die SRAM to fulfill an 'immediate read' operation, if received. In the garbage collection method, blocks of data are read from one or more source NAND flash devices and stored in on-die SRAM of a destination NAND flash device until a limit of such blocks has been reached, then the destination NAND flash device programs the blocks from the on-die SRAM into NAND flash memory.

20 Claims, 14 Drawing Sheets

(58) Field of Classification Search
CPC ....... G06F 2212/284; G06F 2212/7203; G06F 2212/7205; G06F 2212/7208
See application file for complete search history.

(56) References Cited

U.S. PATENT DOCUMENTS

| | | | |
|---|---|---|---|
| 2012/0159072 A1* | 6/2012 | Hida | G06F 12/0862 711/119 |
| 2012/0278564 A1* | 11/2012 | Goss | G06F 12/00 711/155 |
| 2013/0166825 A1 | 6/2013 | Kim et al. | |
| 2014/0115235 A1* | 4/2014 | Ito | G06F 12/0246 711/103 |
| 2014/0281152 A1* | 9/2014 | Karamcheti | G06F 3/061 711/103 |
| 2016/0253239 A1* | 9/2016 | Um | G06F 3/0673 714/766 |
| 2017/0220292 A1* | 8/2017 | Hashimoto | G06F 3/0665 |
| 2018/0189194 A1* | 7/2018 | Halpern | G06F 21/602 |
| 2018/0307598 A1* | 10/2018 | Fischer | G06F 3/0643 |
| 2019/0294345 A1 | 9/2019 | Yu et al. | |
| 2021/0141433 A1* | 5/2021 | Watt | G06F 11/1076 |
| 2023/0132931 A1* | 5/2023 | Greathouse | G06F 13/28 711/154 |

* cited by examiner

METHOD FOR USING NAND FLASH MEMORY SRAM IN SOLID STATE DRIVE CONTROLLER

CROSS-REFERENCE TO RELATED APPLICATIONS

This application is a continuation of International Application No. PCT/US2020/034644 filed on May 27, 2020, by Futurewei Technologies, Inc., and titled "Method for Using NAND Flash Memory SRAM in Solid State Drive Controller," which is hereby incorporated by reference.

TECHNICAL FIELD

The present disclosure is generally related to SSD (Solid State Drive) controllers, and specifically to methods for using NAND (Not-AND) flash memory SRAM (Static Random Access Memory) in SSD controllers.

BACKGROUND

SSDs store data in solid state devices, rather than in a magnetic or optical medium. A typical SSD comprises a controller and solid state memory devices. A host device performs write and read operations on the SSD. In response, the SSD acknowledges receipt of the data, stores the data, and subsequently retrieves data. During use, blocks of data previously written to a solid state memory device may become invalid and unusable until they are erased. In a procedure called 'garbage collection,' still-valid blocks are collected from a first solid state device, aggregated, and rewritten to other solid state devices. Some or all of the first solid state device is then erased and made available again for writing data.

SUMMARY

A first aspect relates to a write operation method implemented by a solid state drive (SSD) controller of a SSD having a plurality of Not-AND (NAND) flash devices with on-die Static Random Access Memory (SRAM) and NAND flash memory. The method includes receiving a block of data from a stream comprising a plurality of blocks of data; determining whether a stripe has been created for the stream; creating the stripe for the stream based on the determination that the stripe has not been created for the stream, the stripe created by assigning a first subset of the plurality of NAND flash devices to the stripe, and setting a limit for how many of the plurality of blocks of data can be stored for the stripe in the on-die SRAM of each of the plurality of NAND flash devices in the first subset; storing the block of data for the stripe in the on-die SRAM of one of the NAND flash devices in the first subset; and instructing the one of the NAND flash devices to program each block of data stored for the stripe in the on-die SRAM of the one of the NAND flash devices into the NAND flash memory of the one of the NAND flash devices when the storing of the block of data in the on-die SRAM of the one of the NAND flash devices caused the limit to be reached.

Optionally, in any of the preceding aspects, another implementation of the aspect provides further comprising: causing each of the NAND flash devices in the first subset to mark as available for re-use the on-die SRAM of each of the NAND flash devices in the first subset when all of the NAND flash devices in the first subset have successfully programmed the blocks of data from the on-die SRAM of the NAND flash devices in the first subset into the NAND flash memories of the NAND flash devices in the first subset.

Optionally, in any of the preceding aspects, another implementation of the aspect provides that each block of data of the stream is received from a host device and the method includes prior to storing the block of data for the stripe in the on-die SRAM of one of the NAND flash devices in the first subset, storing the block of data in a SRAM of the SSD controller; sending an acknowledgement message to the host device; and marking as available for re-use the SRAM of the SSD controller that is storing the block of data when the block of data has been stored successfully in the on-die SRAM of the one of the NAND flash devices.

Optionally, in any of the preceding aspects, another implementation of the aspect provides that the SSD controller comprises a plurality of channels, each channel coupled to a second subset of the plurality of NAND flash devices, and each of the NAND flash devices in the first subset is coupled to a different channel than other NAND flash devices in the first subset.

Optionally, in any of the preceding aspects, another implementation of the aspect provides the step of determining whether the stripe has been created for the stream comprises determining that the stripe has not been created for the stream when all blocks of data of a previously created stripe have been stored in the on-die SRAMs of the NAND flash devices in the first subset.

Optionally, in any of the preceding aspects, another implementation of the aspect provides that the stream is a first stream and each received block of data of the first stream includes a stream identifier that identifies the first stream further comprising: receiving a second block of data from a second stream comprising a second plurality of blocks of data, the second block of data including a second stream identifier that identifies the second stream; determining whether a second stripe has been created for the second stream; creating the second stripe for the second stream based on the determination that the second stripe has not been created for the second stream, the second stripe created by assigning a third subset of the plurality of NAND flash devices to the second stripe, and setting a second limit for how many of the second plurality of blocks of data can be stored for the second stripe in the on-die SRAM of each of the plurality of NAND flash devices in the third subset; storing the second block of data for the second stripe in the on-die SRAM of one of the NAND flash devices in the third subset; and instructing the one of the NAND flash devices in the third subset to program each block of data stored for the second stripe in the on-die SRAM of the one of the NAND flash devices in the third subset into the NAND flash memory of the one of the NAND flash devices in the third subset when the storing of the second block of data in the on-die SRAM of the one of the NAND flash devices in the third subset caused the second limit to be reached.

Optionally, in any of the preceding aspects, another implementation of the aspect provides that blocks of data from the first stream are received interspersed with blocks of data from the second stream.

Optionally, in any of the preceding aspects, another implementation of the aspect provides, further comprising: receiving a read request from a host device, the read request specifying requested blocks of data to be read; determining whether the requested blocks of data are stored in on-die SRAMs of one or more of the plurality of NAND flash devices; based on the determination that the requested blocks of data are stored in on-die SRAMs of the one or more of the plurality of NAND flash devices reading the requested blocks of data from the on-die SRAMs of the one or more of the plurality of NAND flash devices and sending the requested blocks of data to the host device.

Optionally, in any of the preceding aspects, another implementation of the aspect provides further comprising: storing in the SRAM of the SSD controller the requested blocks of data read from the on-die SRAMs of the of the plurality of NAND flash devices; and sending the requested blocks of data from the SRAM of the SSD controller to the host device.

Optionally, in any of the preceding aspects, another implementation of the aspect provides, further comprising: causing any NAND flash device of the plurality of NAND flash devices having blocks of data stored in the on-die SRAM to program the blocks of data into the NAND flash memory of the NAND flash device when a power loss event is sensed.

A second aspect relates to a garbage collection method implemented by a solid state drive (SSD) controller of a SSD having a plurality of Not-AND (NAND) flash devices with on-die Static Random Access Memory (SRAM) and NAND flash memory, the method comprising: selecting a source NAND flash device from the plurality of NAND flash devices; selecting a destination NAND flash device from the plurality of NAND flash devices; setting a limit for how many blocks of data can be written to the destination NAND flash device; transferring a block of data from the source NAND flash device to the destination NAND flash device by reading the block of data from the source NAND flash device, and storing the block of data in the on-die SRAM of the destination NAND flash device; and causing the destination NAND flash device to program the blocks of data from the on-die SRAM of the destination NAND flash device into the NAND flash memory of the destination NAND flash device when the storing of the block of data in the on-die SRAM of the destination NAND flash device caused the limit to be reached.

Optionally, in any of the preceding aspects, another implementation of the aspect provides that the SSD includes flash subsystems coupled to the plurality of NAND flash devices, the flash subsystems including a randomizer and an error correction circuit. The step of reading the block of data from the source NAND flash device includes creating an error-corrected block of data by error correcting the block of data and creating a de-randomized block of data by de-randomizing the error-corrected block of data. The step of storing the block of data in the on-die SRAM of the destination NAND flash device comprises storing a processed block of data by creating a randomized block of data by randomizing the de-randomized block of data and creating the processed block of data by adding error correction codes to the randomized block of data.

Optionally, in any of the preceding aspects, another implementation of the aspect provides, further comprising: decrypting and re-encrypting the block of data between the step of reading the block of data from the source NAND flash device and the step of storing the block of data in the on-die SRAM of the destination NAND flash device.

Optionally, in any of the preceding aspects, another implementation of the aspect provides wherein the SSD controller comprises a plurality of channels, each channel coupled to a subset of the plurality of NAND flash devices, and the source NAND flash device is coupled to a different channel than the destination NAND flash device.

Optionally, in any of the preceding aspects, another implementation of the aspect provides the step of selecting the source NAND flash device comprises selecting a plurality of source NAND flash devices, and the step of transferring the block of data from the source NAND flash device to the destination NAND flash device comprises reading subsequent blocks of data from a second source NAND flash device of the plurality of source NAND flash devices when no blocks of data remain on a first source NAND flash device of the plurality of source NAND flash devices.

Optionally, in any of the preceding aspects, another implementation of the aspect provides, further comprising: specifying locations in the source NAND flash device of the blocks of data to be read from the source NAND flash device; and reading the blocks of data from the specified locations in the source NAND flash device.

Optionally, in any of the preceding aspects, another implementation of the aspect provides wherein the limit is set based on a number of blocks of data the destination NAND flash device has a capacity to store.

Optionally, in any of the preceding aspects, another implementation of the aspect provides wherein: the block of data read from the source NAND flash device is de-randomized using a first randomization key associated with the source NAND flash device to produce the de-randomized block of data; and the de-randomized block of data is randomized using a second randomization key associated with the destination NAND flash device to produce the randomized block of data.

Optionally, in any of the preceding aspects, another implementation of the aspect provides, further comprising: causing any NAND flash device of the plurality of NAND flash devices having blocks of data stored in the on-die SRAM to program the blocks of data into the NAND flash memory of the NAND flash device when a power loss event is sensed.

A third aspect relates to a solid state drive (SSD) controller of a SSD having a plurality of Not-AND (NAND) flash devices with on-die Static Random Access Memory (SRAM) and NAND flash memory, the SSD controller comprising: a means for receiving a block of data from a stream comprising a plurality of blocks of data; a means for receiving a block of data from a stream comprising a plurality of blocks of data; a means for determining whether a stripe has been created for the stream; a means for creating the stripe for the stream based on the determination that the stripe has not been created for the stream, by assigning a first subset of the plurality of NAND flash devices to the stripe, and setting a limit for how many of the plurality of blocks of data can be stored for the stripe in the on-die SRAM of each of the plurality of NAND flash devices in the first subset; a means for storing the block of data for the stripe in the on-die SRAM of one of the NAND flash devices in the first subset; and a means for instructing the one of the NAND flash devices to program each block of data stored for the stripe in the on-die SRAM of the one of the NAND flash devices into the NAND flash memory of the one of the NAND flash devices when the storing of the block of data in the on-die SRAM of the one of the NAND flash devices caused the limit to be reached.

Optionally, in any of the preceding aspects, another implementation of the aspect provides, a means for receiving a read request from a host device, the read request specifying requested blocks of data to be read; a means for determining whether the requested blocks of data are stored in on-die SRAMs of one or more of the plurality of NAND flash devices; and a means for reading the requested blocks of data from the on-die SRAMs of the one or more of the plurality of NAND flash devices and sending the requested blocks of data to the host device, based on the determination that the requested blocks of data are stored in on-die SRAMs of the one or more of the plurality of NAND flash devices.

A fourth aspect relates to a solid state drive (SSD) controller of a SSD having a plurality of Not-AND (NAND) flash devices with on-die Static Random Access Memory (SRAM) and NAND flash memory, the SSD controller comprising: a means for selecting a source NAND flash device from the plurality of NAND flash devices and selecting a destination NAND flash device from the plurality of NAND flash devices; a means for setting a limit for how many blocks of data can be written to the destination NAND flash device; a means for transferring a block of data from the source NAND flash device to the destination NAND flash device by reading the block of data from the source NAND flash device, and storing the block of data in the on-die SRAM of the destination NAND flash device; a means for causing the destination NAND flash device to program the blocks of data from the on-die SRAM of the destination NAND flash device into the NAND flash memory of the destination NAND flash device when the storing of the block of data in the on-die SRAM of the destination NAND flash device caused the limit to be reached.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Newly developed NAND flash memory chips include SRAM on the chip. Such chips may be so-called three dimensional (3D) NAND chips or four dimensional (4D) NAND chips. In this disclosure both types will be referred to, collectively, as 'NAND chips with on-die SRAM.' Some such NAND chips provide 1 MB (megabyte) of on-die SRAM, but others provide more or less than 1 MB of on-die SRAM. This disclosure presents novel processes for performing write operations and garbage collection using the on-die SRAM of such NAND chips with on-die SRAM.

Figure 1:
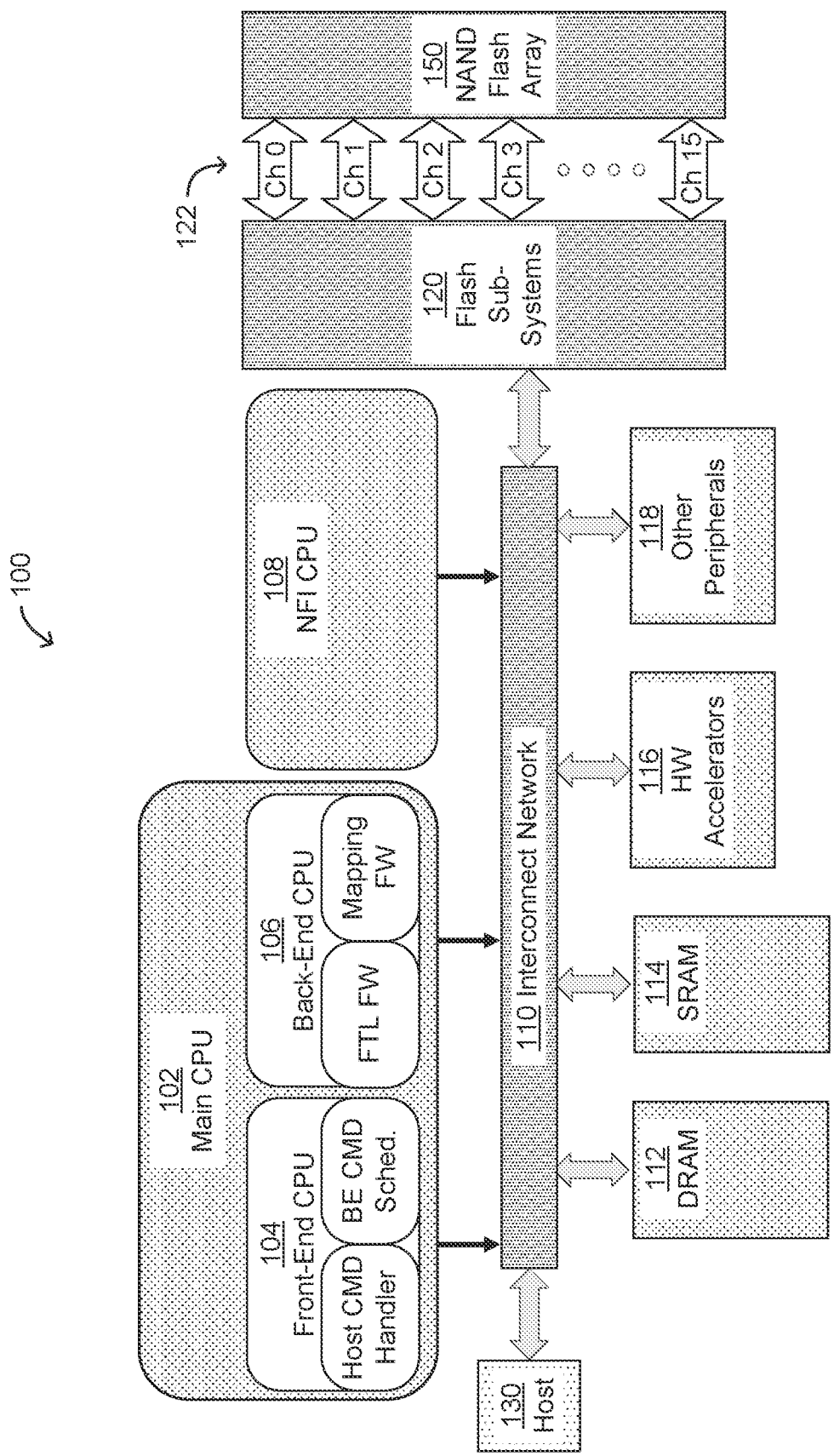
FIG. 1 is a schematic diagram of a NAND flash SSD.

FIG. 1 is a schematic diagram of a NAND flash SSD 100. The SSD 100 includes a main central processing unit (CPU) 102 and a NAND Flash Interface (NFI) CPU 108. The main CPU 102 includes a front-end CPU 104 and a back-end CPU 106. The front-end CPU 104 implements a handler for commands received from a host device 130 via a PCIe bus (Peripheral Component Interconnect Express), SAS bus (Serial Attached SCSI (Small Computer System Interface), or other suitable interface. The front-end CPU 104 also implements a scheduler for Back End (BE) commands that are issued in response to received host commands. The back-end CPU 106 implements back end firmware (FW), performs Flash Translation Layer (FTL), mapping, and other back-end functions.

The NFI CPU 108 controls and manages channels 122. Each channel 122 communicates data and commands to a subset of NAND flash devices 124 in a NAND flash array 150 (which are described in greater detail with reference to FIG. 2). In other SSDs, the main CPU 102 and/or NFI CPU 108 may be implemented with other numbers or types of CPUs and/or other distributions of functionality.

The SSD 100 further includes Dynamic Random Access Memory (DRAM) 112, Static Random Access Memory (SRAM) 114, Hardware (HW) Accelerators 116, and Other Peripherals 118. The DRAM 112 is 32 Gigabytes (GB) in size, but may be larger or smaller in other SSDs. The SRAM 114 is 10 Megabytes (MB), but may be larger or smaller in other SSDs.

The HW Accelerators 116 includes an Exclusive-OR (XOR) engine, a buffer manager, a HW Garbage Collection (GC) engine, and may include other HW circuits designed to independently handle specific, limited functions for the main CPU 102 and the NFI CPU 108. The Other Peripherals 118 may include circuits such as a Serial Peripheral Interface (SPI) circuit, a General Purpose Input/Output (GPIO) circuit, an Inter-Integrated Circuit (I2C) bus interface, a Universal Asynchronous Receiver/Transmitter (UART) circuit, and other interface circuits.

The SSD 100 further includes flash subsystems 120, which may include a Low Density Parity Check (LDPC) or other error correction circuit, a randomizer circuit, a flash signal processing circuit, and may include other circuits that provide processing relating to writing and reading data to the NAND flash array 150. The main CPU 102, the NH CPU 108, the DRAM 112, the SRAM 114, the HW Accelerators 116, the Other Peripherals 118, and the flash subsystems 120 comprise a SSD controller and are communicatively coupled to the host device 130 by an Interconnect Network (or bus) 110.

Figure 2:
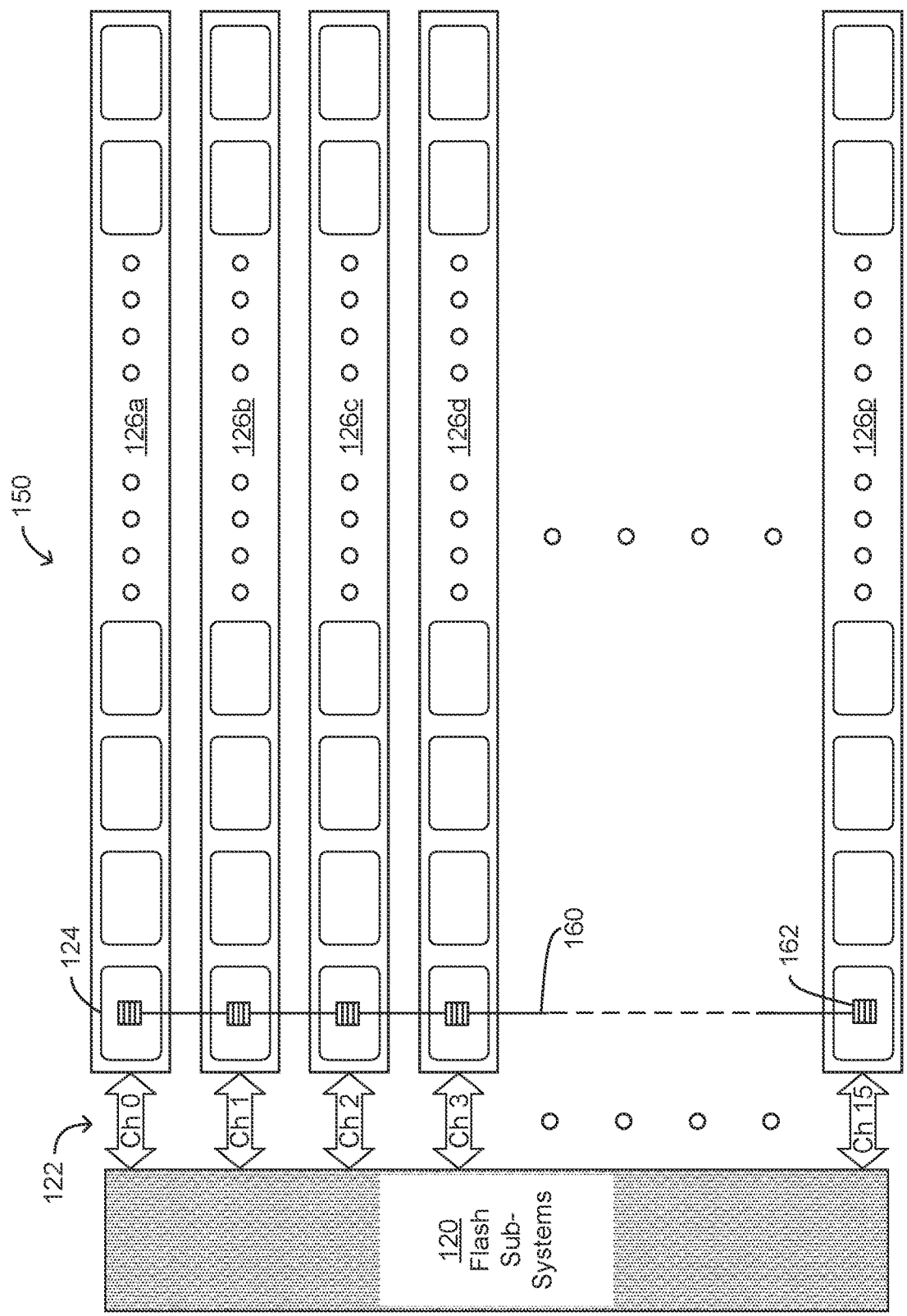
FIG. 2 is a schematic diagram of the NAND flash devices of the SSD of FIG. 1.

FIG. 2 is a schematic diagram of the NAND flash array 150 of the SSD 100 of FIG. 1. Each channel 122 communicates data and commands from the flash subsystems 120 to a subset of NAND flash chips of the NAND flash array 150. The sixteen channels CH0, CH1 . . . CH15 are coupled respectively to subsets 126a, 126b . . . 126p of the NAND flash array 150. Within each subset are sixteen NAND flash devices 124 (which may also be referred to as Logical Units (LUNs)). Each NAND flash device 124 is coupled to a channel 122 and no NAND flash device 124 is coupled to more than one channel 122. In other SSDs, fewer channels or more channels may be used. Similarly, in other SSDs, fewer or more NAND flash devices per channel may be provided.

A stripe 160 comprises one NAND flash device 124 from each of the subsets 126a, 126b . . . 126p of the NAND flash array 150. The stripe 160 further comprises one or more blocks of data 162 within each of the NAND flash devices 124 of the stripe 160.

Figure 3:
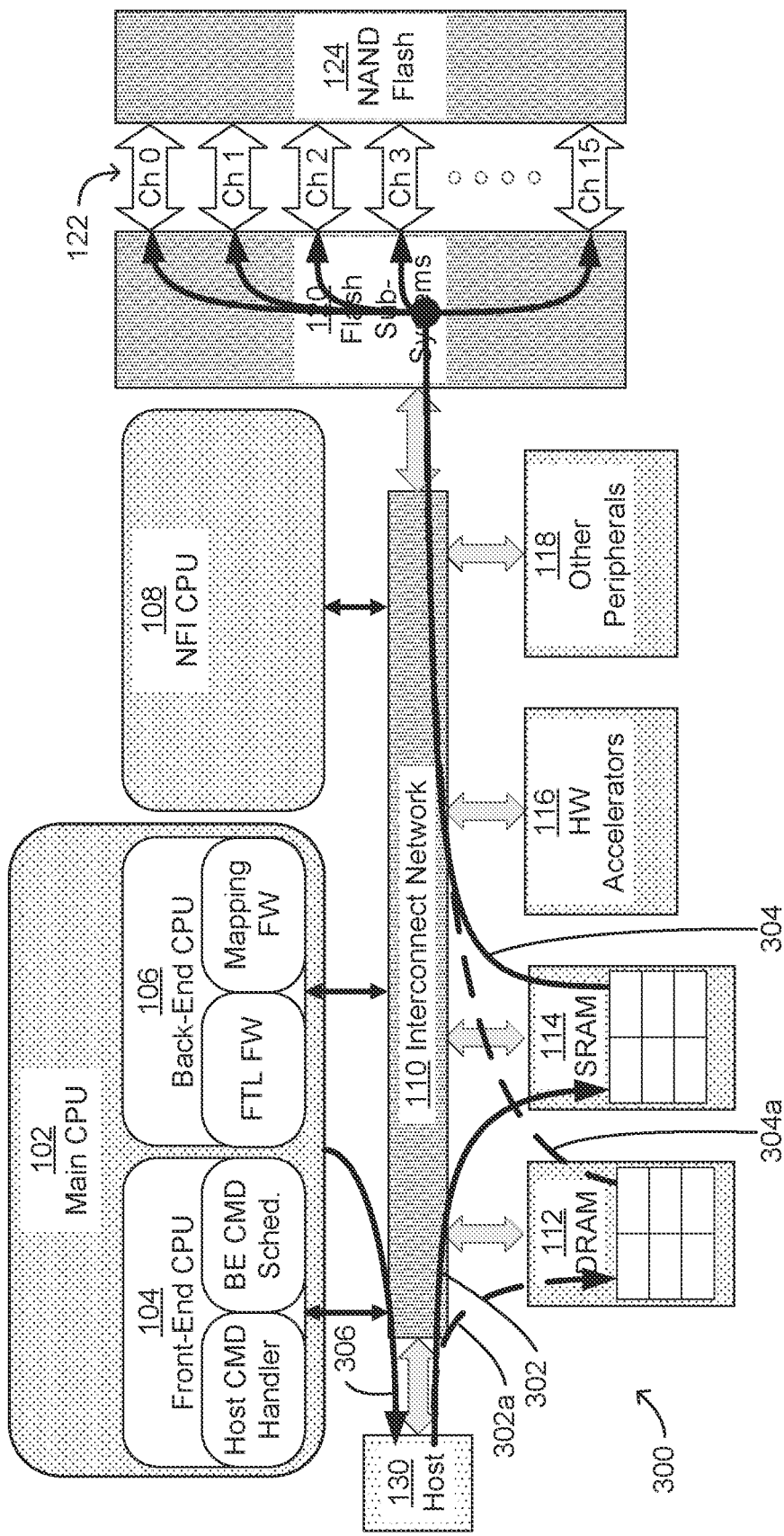
FIG. 3 is a data flow diagram of the SSD of FIG. 1 performing a write operation process.

FIG. 3 is a data flow diagram of the SSD 100 of FIG. 1 performing a write operation process 300. In step 302, the host device 130 sends the SSD 100 a stream of blocks of data to be written into the NAND flash array 150. As the blocks in a stream come into the SSD 100, they are temporarily stored in the SRAM 114. In some SSDs, received blocks may also temporarily be stored in the DRAM 112 as shown in step 302a. Once each block is successfully stored in the SRAM 114 or the DRAM 112, in step 306, an acknowledgement for that block is sent to the host device 130. Once a sufficient number of blocks are received to form a stripe 160 (described with reference to FIG. 2), the blocks of the stripe 160 are written to the NAND flash array 150 from the SRAM 114 in step 304 (or from the DRAM 112 in step 304a) in what is referred to as a 'flush' operation. The stripe 160 includes one or more blocks to be written via each of the sixteen channels 122 into a NAND flash device of each of the sixteen subsets 126a through 126p of the NAND flash array 150.

The host device 130 may have multiple concurrent applications, each of which writes and reads its own stream of blocks to the SSD 100, calling for the SSD to offer multi-stream functionality. As such, the stream of blocks received in step 302 may be interspersed blocks from multiple streams, with each block including a stream identifier to separate the blocks by stream. Hosts may have other reasons for offering multi-stream-like SSD functionality, such as storage of persistent database objects and key:value storage.

While the blocks written from the host device 130 to the SSD 100 are typically small compared to the size of the SRAM 114 and DRAM 112, several factors combine to limit the number of separate simultaneous streams that the SSD 100 can offer to the host device 130. Those factors include, but are not limited to, the number of blocks in the stripe 160, the time required to write the stripe 160 into the NAND flash array 150 and receive confirmation that all the blocks have been successfully written, and the size of the SRAM 114 (and/or the DRAM 112).

On occasion, the host device 130 will perform a read operation on the SSD 100 to read data that the host device 130 has just written to the SSD 100. Such a read operation may be referred to as an 'immediate read' or an 'immediate read after write.' If the host device 130 performs the immediate read operation prior to the initiation of the flush operation of step 304, the main CPU 102 determines that the requested data is still stored in the SRAM 114 (or the DRAM 112) and sends that stored data to the host device 130 to fulfill the read operation. In such situations, the read operation can be fulfilled within a few tens of microseconds.

However, if the flush operation of step 304 has begun, the requested data is no longer available from the SRAM 114 (or the DRAM 112) and the read operation cannot be fulfilled until after the requested data has been programmed into the NAND flash array 150. In such situations, fulfillment of the read operation may be delayed by 3-7 milliseconds.

Figure 4:
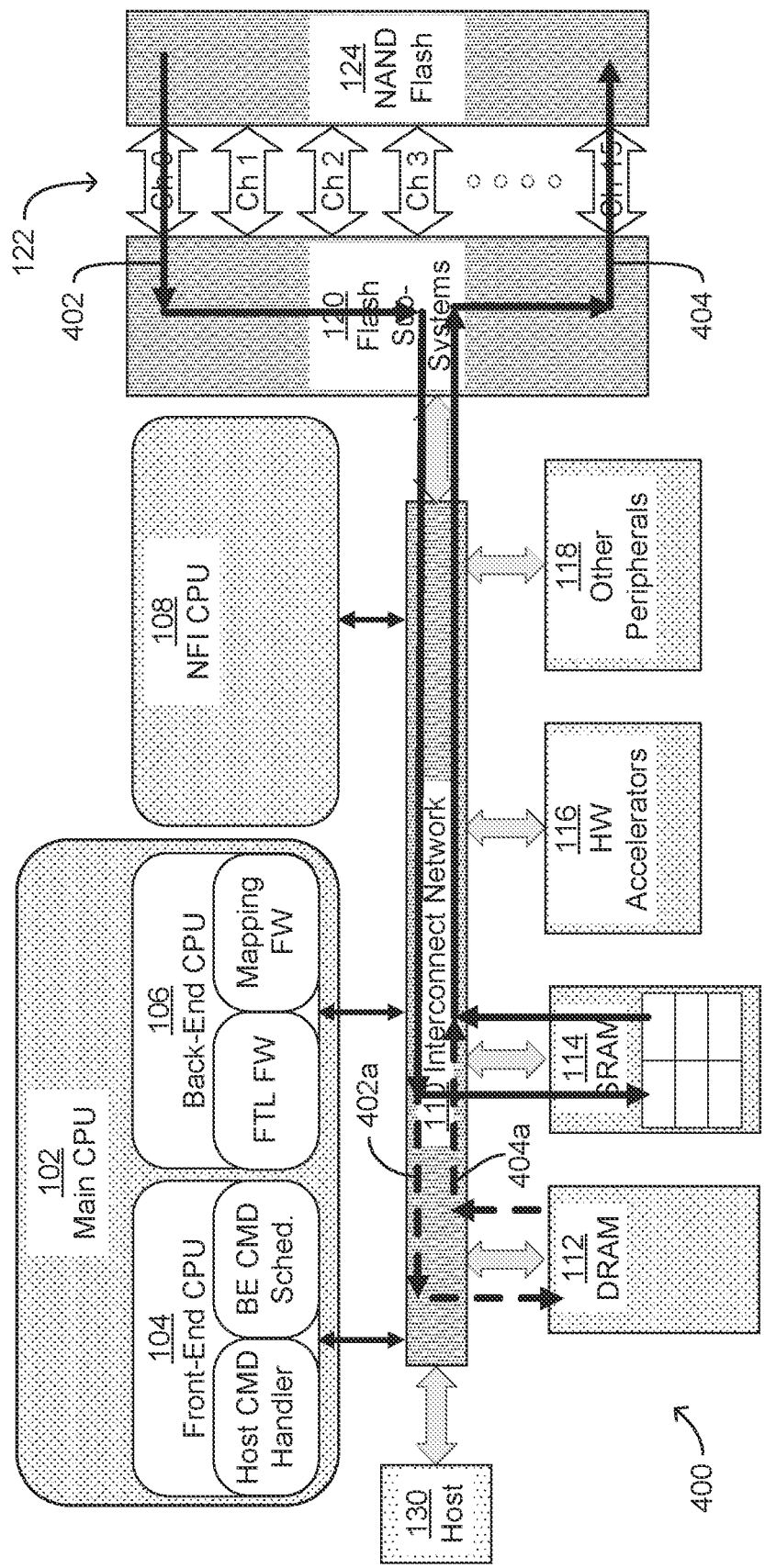
FIG. 4 is a data flow diagram of the SSD of FIG. 1 performing a garbage collection (GC) process.

FIG. 4 is a data flow diagram of the SSD 100 of FIG. 1 performing a garbage collection process (GC) 400. GC may be initiated by the main CPU 102 and performed by a GC engine in the HW Accelerators 116. In step 402, all valid blocks from one or more source NANDs of the subset 126a of the NAND flash array 150 are read via the CH0 channel 122 and temporarily stored in the SRAM 114. Once a sufficient number of valid blocks have been collected, in step 404 the blocks are written into a destination NAND of the subset 126p of the NAND flash array 150 via the CH15 channel 122. While the data flow diagram of the GC process 400 is illustrated using the subsets 126a and 126p, it will be understood that the garbage collection process 400 may be performed using any source and destination NANDs of the NAND flash array 150, although typically the source and destination NANDs are accessed via different ones of the channels 122.

While the data flow diagram of the GC process 400 shows only a single GC process being performed, in some SSDs parallel GC processes are performed on multiple source NANDs at the same time, using other combinations of channels 122. In some such SSDs, the total number of valid blocks being collected across the multiple garbage collection processes may be limited by the size of SRAM 114 or may require that the DRAM 112 be used as overflow storage for the SRAM 114, with some valid blocks being temporarily stored in step 402a and written to the destination NAND in step 404a.

Figure 5:
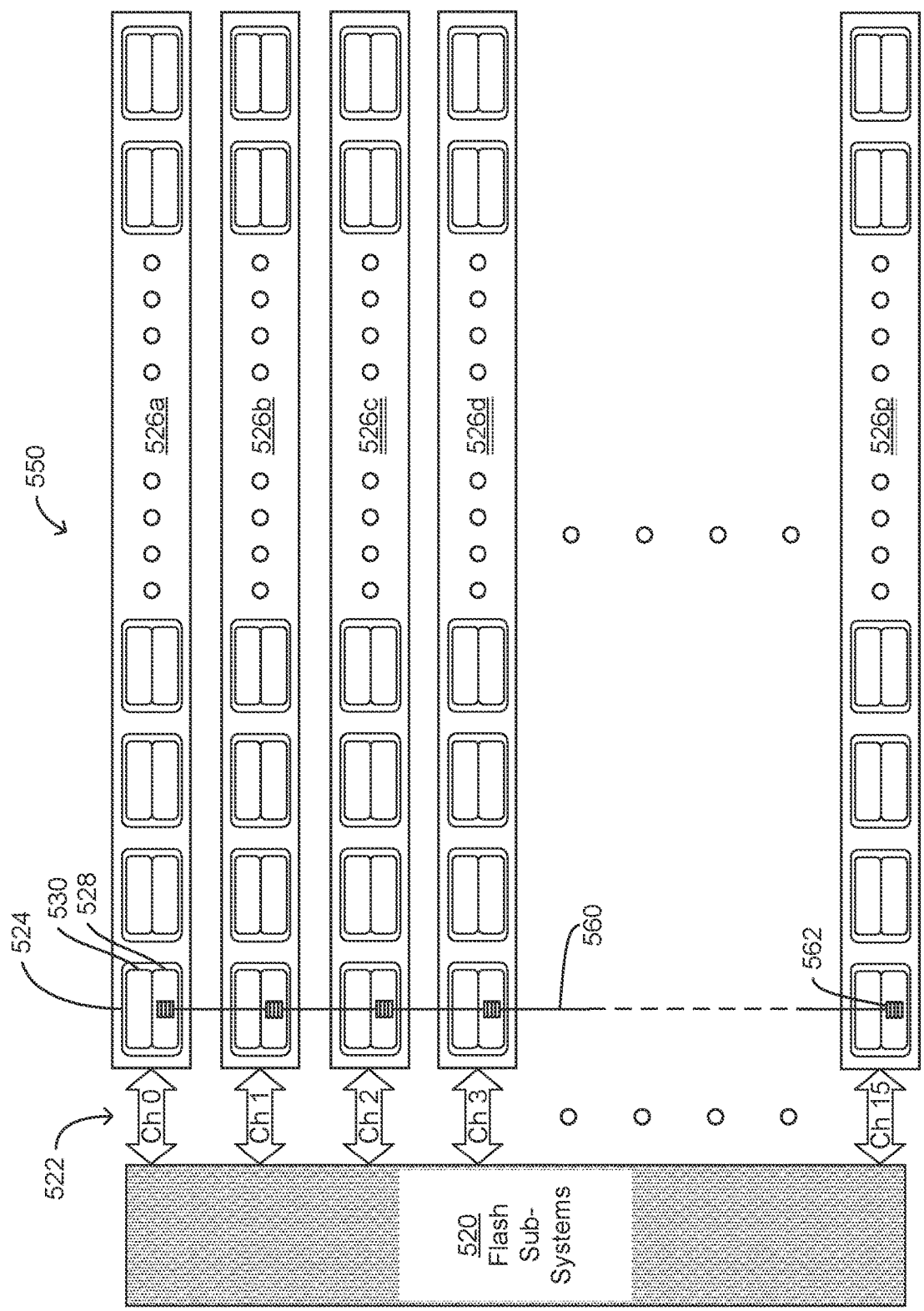
FIG. 5 is a schematic diagram of NAND flash devices of a SSD according to the disclosure.

FIG. 5 is a schematic diagram of NAND flash array 550 of a SSD 500 (shown in more detail in FIG. 6) according to the disclosure. The NAND flash array 550 comprises a plurality of NAND flash devices 524. Each channel 522 communicates data and commands from flash subsystems 520 to a subset 526a, 526b, . . . 526p of NAND flash devices 524 in the NAND flash array 550. Within each subset are sixteen NAND flash devices 524 (which may also be referred to as LUNs). Each NAND flash device 524 is coupled to a channel 522 and no NAND flash device 524 is coupled to more than one channel 522. In other SSDs according to the disclosure, fewer channels or more channels may be used. Similarly, in other SSDs according to the disclosure, fewer or more NAND flash devices per channel may be provided. Each NAND flash device 524 includes an on-die SRAM 528 and a flash memory 530.

In some embodiments, the SRAM 528 is 1 MB in size, but in other embodiments it may be larger. In some other embodiments, more than sixteen NAND flash devices may be included in a subset and/or more than sixteen channels and subsets may be coupled to the flash subsystems 520.

Figure 6:
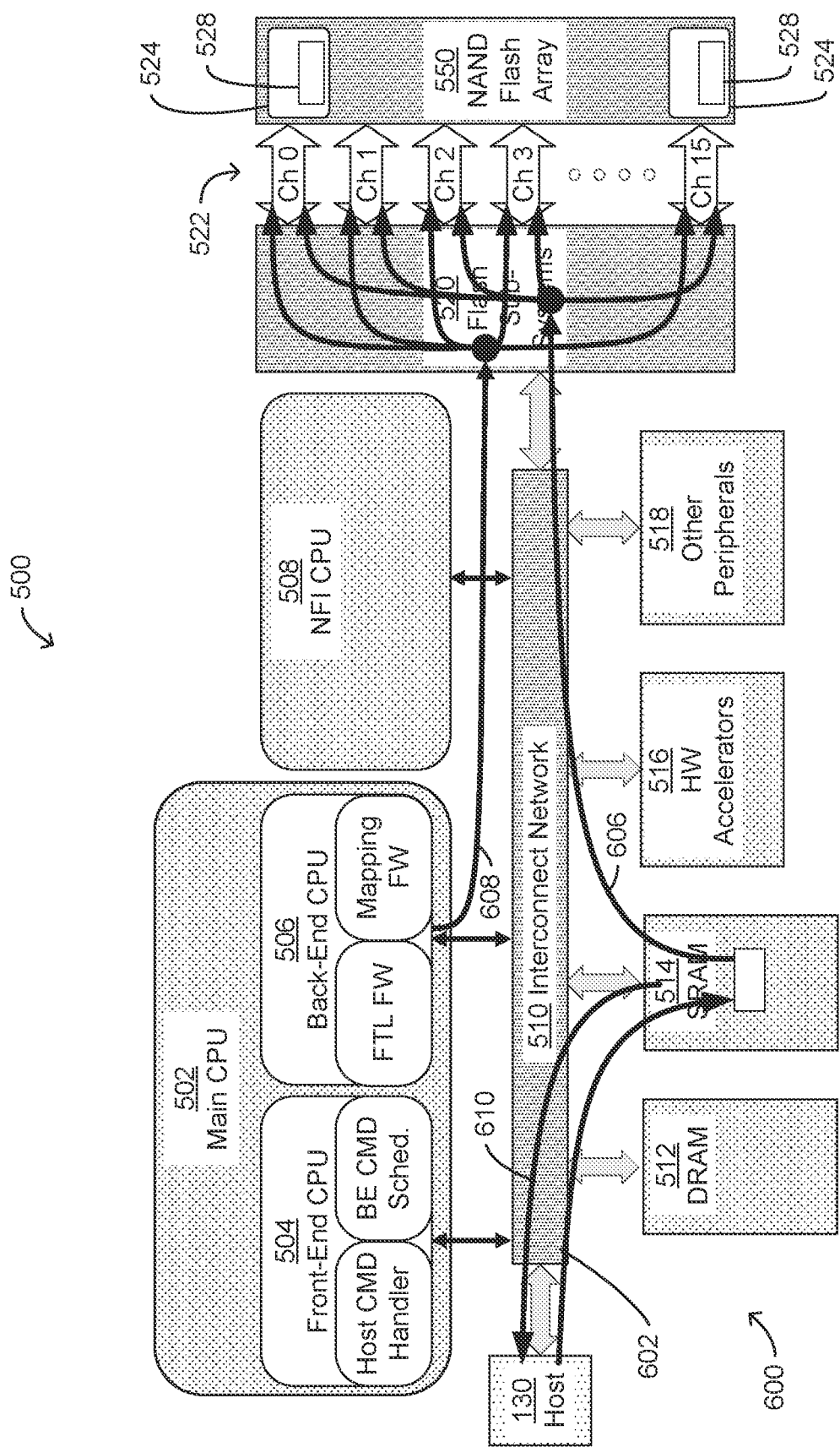
FIG. 6 is a data flow diagram of a SSD according to the disclosure performing a write operation process.

FIG. 6 is a data flow diagram of the SSD 500 according to the disclosure performing a write operation process 600 for a block of data. In step 602, the SSD 500 receives from the host device 130 the block of data from a stream comprising a plurality of blocks of data, the blocks of data to be written into the NAND flash array 550. As each block is received, the front-end CPU 504 stores the block temporarily in the SRAM 514 and, once successfully stored in the SRAM 514, in step 610 the front-end CPU 504 sends an acknowledgement for the block to the host device 130. When the first block in a stream is received, in step 604 (shown in in FIG. 8C) the back-end CPU 506 determines that no stripe has been created for the stream and, in response, creates a stripe 560 and assigns stripe NAND flash devices 524 to the stripe 560 and a limit on number of blocks to be written to each assigned stripe NAND flash device 524. The assigned stripe NAND flash devices 524 comprise a subset of the NAND flash devices 524 in the NAND flash array 550. When the first block in a new stripe 560 is received, the assignment is made for the stripe NAND flash devices 524 in each channel 522 where the blocks of the new stripe 560 will be stored.

The stripe 560 comprises one NAND flash device 524 from each of the subsets 526a, 526b, . . . 526p of the NAND flash array 550. The stripe 560 further comprises one or more blocks of data 562 within the on-die SRAM 528 of each of the NAND flash devices 524 of the stripe 560.

In other SSDs according to the disclosure, the creation of stripe 560 assignments may be made elsewhere in the main CPU 502. While the stripe 560 uses the first NAND flash device 524 in each of the subsets 526a, 526b, . . . 526p of the NAND flash devices 524 of the NAND flash array 550, it will be understood that another stripe 560 may use different NAND flash device 524 in different ones of the subsets 526a, 526b, . . . 526p. For example, the second NAND flash device 524 of the subset 526a, the tenth NAND flash device 524 of the subset 526b, the sixth NAND flash device 524 of the subset 526c, etc.

Once each block in the stripe 560 is received and stored into the SRAM 514, without waiting for all the blocks in the stripe 560 to be received, in step 606 the NFI CPU 508 writes the block to the on-die SRAM 528 in the block's assigned stripe NAND flash device 524 for temporary storage. Once each block has been written to the on-die SRAM 528, the block's storage space in the SRAM 514 is freed for subsequent use.

In some embodiments, the stripe 560 comprises 64 blocks, with four blocks written to each of the SRAMs 528 in the stripe NAND flash devices 524. In some such embodiments, the first four received blocks in the stripe 560 are written to the SRAM 528 of the stripe NAND flash device 524 coupled to channel 522 CH0, the next four received blocks to the SRAM 528 of the stripe NAND flash device 524 coupled to channel 522 CH1, and so on until the final four received blocks in the stripe 560 are written to the SRAM 528 of the stripe NAND flash device 524 coupled to channel 522 CH15. In other such embodiments, the first received block in the stripe 560 is written to the SRAM 528 of the stripe NAND flash device 524 coupled to channel 522 CH0, the second received block is written to the SRAM 528 of the stripe NAND flash device 524 coupled to channel 522 CH1, and so on until the sixteenth received block is written to the SRAM 528 of the stripe NAND flash device 524 coupled to channel 522 CH15. Then, the seventeenth received block in the stripe 560 is written to the SRAM 528 of the stripe NAND flash device 524 coupled to channel 522 CH0, the eighteenth received block to the SRAM 528 of the stripe NAND flash device 524 coupled to channel 522 CH1, and so on until the sixty-fourth received block is written to the SRAM 528 of the stripe NAND flash device 524 coupled to channel 522 CH15.

In other embodiments, the stripe 560 may comprise more or fewer than 64 blocks, with the blocks distributed equally or unequally among stripe NAND flash devices 524. In the scenario just described are written in sequence to on-die SRAMs 528 of stripe NAND flash devices 524 coupled to channels 522 CH0, CH1, . . . CH15, however it will be understood that in other scenarios the blocks may be written in an arbitrary sequence to the on-die SRAMs 528 in the stripe NAND flash devices 524 coupled to channels 522 CH0-CH15 until the entire stripe 560 has been written into on-die SRAMs 528.

Also in step 606, the NH CPU 508 determines whether the limit has been reached for the number of blocks to be written to the on-die SRAM 528 of the stripe NAND flash device 524. If the limit has been reached, the NFI CPU 508 issues a 'commit' command to that stripe NAND flash device 524 to cause it to program the blocks from its on-die SRAM 528 into the NAND flash memory 530 of the stripe NAND flash device 524. Similar individual 'commit' commands are sent individually to each of the other stripe NAND flash devices 524 as their limits are reached. As such, the NAND flash memory 530 of each stripe NAND flash device 524 that is receiving blocks for the stripe 560 is programmed independently and asynchronously of the NAND flash memory 530 of other stripe NAND flash devices 524. However, to allow recovery from a write failure in any of the stripe NAND flash devices 524, the blocks in the stripe 560 are kept in their respective on-die SRAMs 528 until all the blocks of the stripe 560 have been successfully programmed into the NAND flash memories 530 of all the stripe NAND flash device 524 of the stripe 560, and only then, in step 608, does the back-end CPU 506 send a 'release' command to cause all stripe NAND flash devices 524 of the stripe 560 to mark as available for re-use the blocks' storage space in their on-die SRAMs 528. Should a write failure occur in any stripe NAND flash device 524, the 'release' command will not be sent and the data from one or more of the stripe NAND flash devices 524 can be recovered from the on-die SRAMs 528, reprocessed as appropriate, and written to the on-die SRAMs 528 of one or more other NAND flash devices 524, to be programmed into the NAND flash memory 530 of the one or more other flash devices 524.

Once the complete stripe 560 has been written to the NAND flash array 550, when an additional block in the same stream is received, another stripe is created in step 604.

The SSD 500 is configured to receive blocks from multiple streams simultaneously. It can be seen from the description of the write operation process 600 that the number of streams that the SSD 500 can receive simultaneously from the host device 130 is greater than for the SSD 100, because the blocks of each stream received by the SSD 500 are stored in the SRAM 514 for only the amount of time required to write each block to the on-die SRAMs 528 in the stripe NAND flash devices 524, and then the storage space in the SRAM 514 for the block is released for re-use. In contrast, in the SSD 100 all the blocks in a stripe must be stored in the SRAM 114 prior to writing them to the NAND flash array 150 and releasing their storage space in the SRAM 114 for re-use.

While the process 600 has been described as storing blocks that are part of a stream, it will be understood that the process 600 may also be used to store blocks sent by the host device 130 for storage of persistent database objects and/or for key:value storage.

If the host device 130 performs an 'immediate read' operation that requests data currently being written to a stripe 560, the requested data is available from the on-die SRAMs 528 of the stripe NAND flash devices 524 that are associated with the stripe 560 throughout the lengthy process of programming the blocks of data of the stripe 560 into the stripe NAND flash devices 524. That is, throughout the write operation process 600, an 'immediate read' operation requesting blocks of data currently being written to the stripe 560 may be fulfilled within a few tens of microseconds by reading the requested blocks of data from one or more of the on-die SRAMs 528, storing them in the SRAM 514, and sending the requested blocks to the host device 130 to fulfill the read operation (as described in greater detail with reference to FIG. 10). Once the programming of the associated stripe NAND flash devices 524 is completed and the back-end CPU 506 has sent the 'release' command to free the storage space for the stripe 560 in the on-die SRAMs 528, the requested data for the 'immediate read' operation is no longer available in the stripe NAND flash devices 524. As such, the write operation process 600 eliminates the lengthy delay in fulfilling an 'immediate read' operation in the write operation process 300 of the SSD 100 that occurs if an 'immediate read' operation is received after the flush operation of step 304 has begun but before the requested data has been programmed into the NAND flash array 150.

Figure 7:
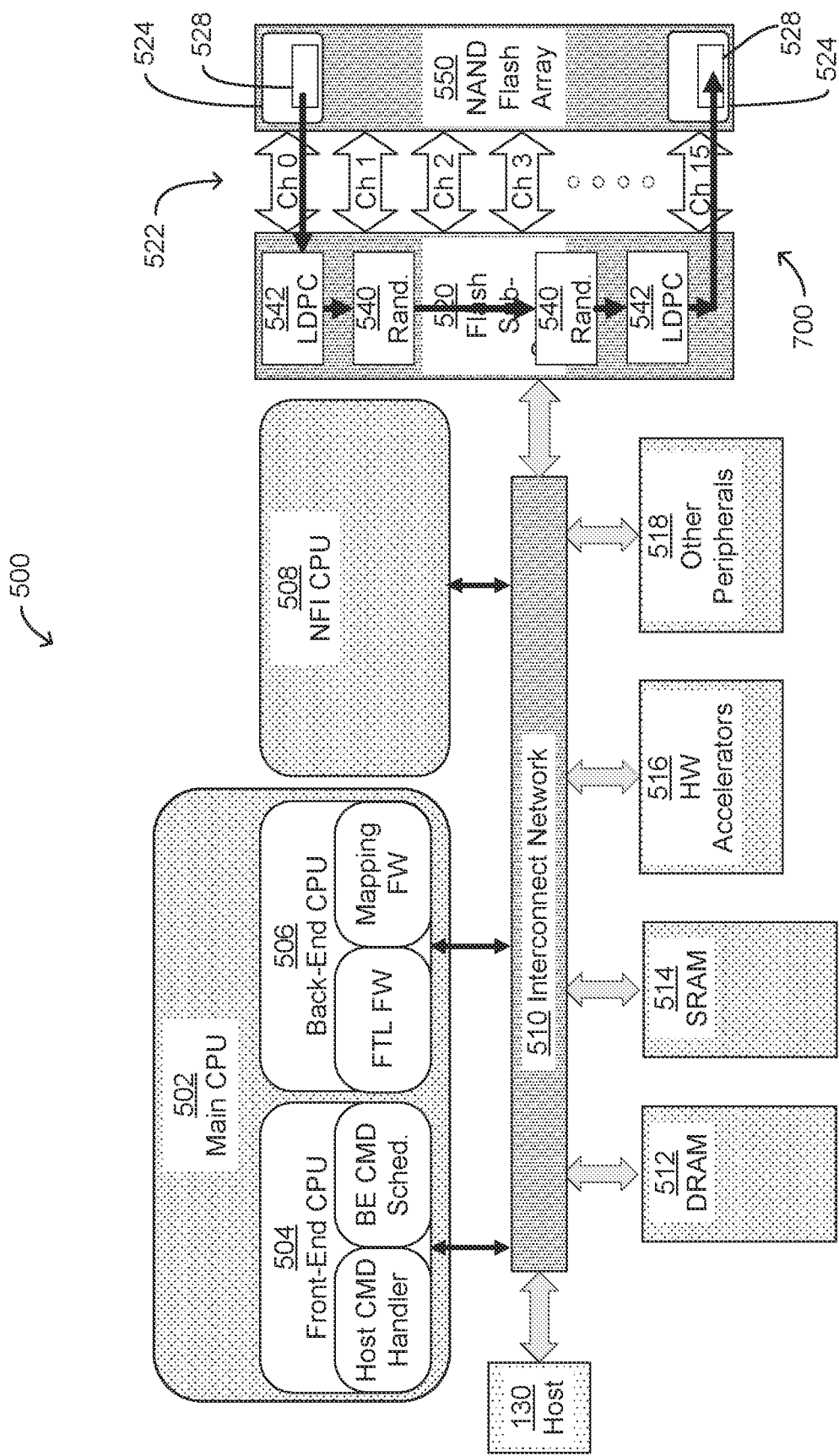
FIG. 7 is a data flow diagram of the SSD of FIG. 6 performing a GC process.

FIG. 7 is a data flow diagram of the SSD 500 of FIG. 6 performing a garbage collection process 700. The main CPU 502 prepares parameters for the garbage collection process 700 by selecting one or more NAND flash devices 524 (or source NANDs) coupled to channel 522 CH0 for garbage collection, selecting a NAND flash device 524 (or destination NAND) coupled to channel 522 CH15 to receive the collected blocks, and setting a limit for how many blocks of data can be written to the destination NAND flash device 524. To perform the garbage collection, valid blocks from the selected source NAND flash devices 524 are then read out into the circuits of the flash subsystems 520. In the flash subsystems 520, the blocks are error corrected by a LDPC circuit 542, they are de-randomized by a randomizer 540 using the randomization key for their source NAND flash device 524, then they are re-randomized by the randomizer 540 using the randomization key for the destination NAND flash device 524, and error correction codes are added by the LDPC circuit 542. Once re-randomized and error correction coded, the blocks are written via the CH15 channel 522 into the on-die SRAM 528 of the destination NAND flash device 524. The blocks in the on-die SRAM 528 may be programmed into the NAND flash memory 530 of the destination NAND flash device 524 individually as blocks are written into the on-die SRAM 528, in groups as the limit of blocks are written into the on-die SRAM 528, or in a single write operation once they have all been written into the on-die SRAM 528.

In some embodiments, between de-randomization and re-randomization, the blocks are sent to an encryption/decryption engine in the HW Accelerators 516, where they are decrypted and re-encrypted prior to re-randomization by the randomizer 540.

While the process 700 is described as collecting valid blocks from a source NAND flash device 524 coupled to channel 522 CH0 and writing the processed blocks to the destination NAND flash device 524 coupled to channel 522 CH15, it will be understood that the process 700 may be used to collect valid blocks from a source NAND flash device 524 coupled to any channel 522 and write the collected blocks to a destination NAND flash device 524 in any other channel 522.

Figure 8A:
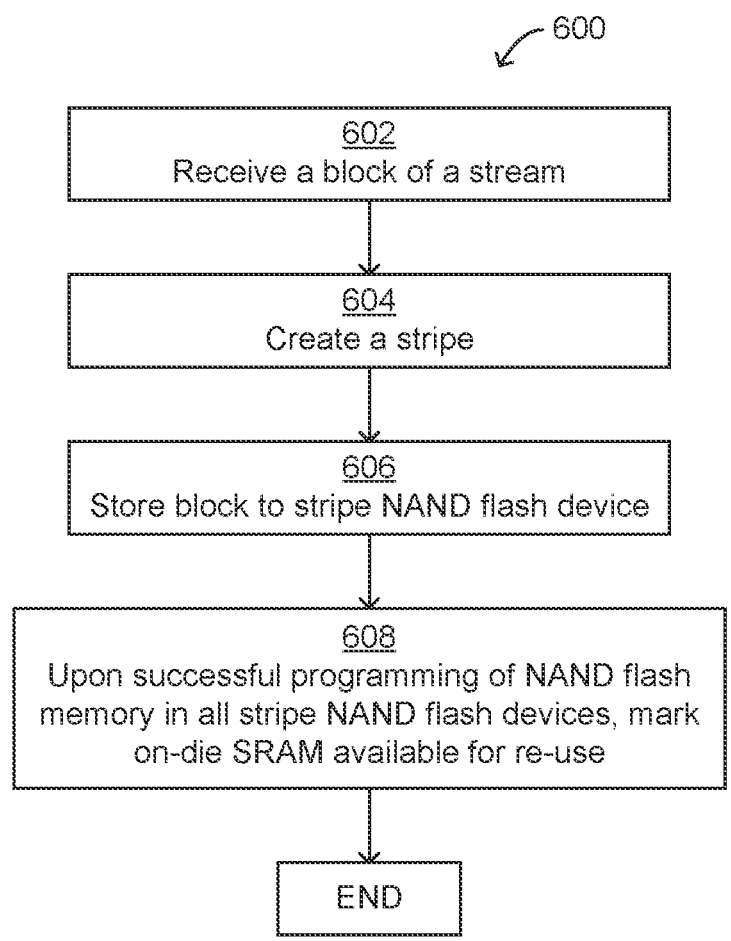
FIGS. 8A-8D present a more detailed view of the write operation process of FIG. 6.

FIGS. 8A-8D present a more detailed view of the write operation process 600 of FIG. 6. FIG. 8A presents an overview of the write operation process 600. In step 602, the SSD 500 receives from the host device 130 a block of data from a stream comprising a plurality of blocks of data to be written into the NAND flash array 550. In step 604, the back-end CPU 506 determines that no stripe 560 has been created for the stream (or that a previous stripe 560 for the stream has been completed) and, in response, creates a stripe 560 in which to store the received blocks of data. In step 606, the SSD 500 stores the received block of data into one of the NAND flash devices 524 assigned to the stripe 560. Once the stripe 560 has been filled, upon receipt of a subsequent block of data of the stream, the step 604 is repeated, to create an additional stripe 560. The steps 602, 604, and 606 are described in more detail below, with reference to FIGS. 8B, 8C, and 8D, respectively.

In step 608, once the NFI CPU 508 reports to the back-end CPU 506 that all the stripe NAND flash devices 524 have successfully programmed their blocks of data for the stripe 560 into their NAND flash memories 530, the back-end CPU 506 causes all the stripe NAND flash devices 524 to mark the portions of their on-die SRAMs 528 in which they had stored the blocks of data of the stripe 560 as available for re-use.

The block of data received in step 602 includes a stream identifier, identifying the stream to which it belongs. The SSD 500 may receive blocks of data from a plurality of streams in an interspersed manner. If the SSD 500 receives a block of data having a stream identifier different from those of previously received blocks of data, the SSD 500 creates a new instantiation of the write operation process 600 for each newly identified stream. Each instantiation creates independent stripes 560 for its stream and stores the blocks of data of its stream to the independent stripes 560. While the description above uses the term 'stream identifier' for data that identifies a stream, it will be understood that the term may also be used for a stream that stores a persistent database object or a key:value database.

Figure 8B:
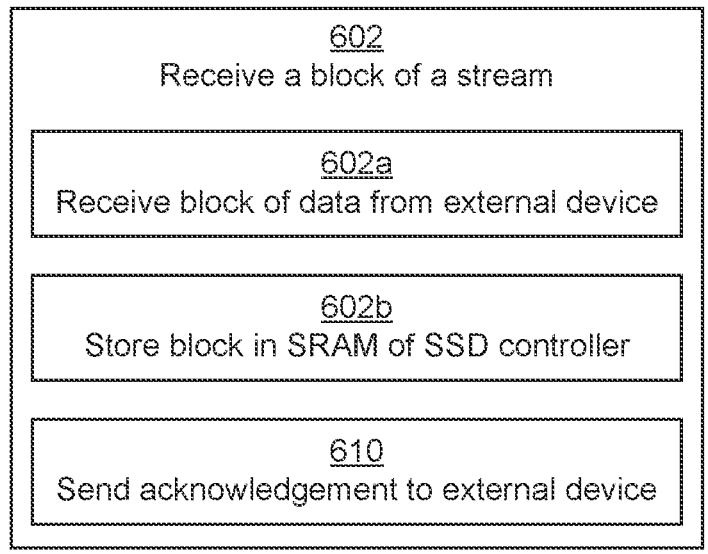

FIG. 8B presents the step 602 of receiving from the host device 130 a block of data from a stream in more detail. In step 602a, a block of data is received from the host device 130. In step 602b, the front-end CPU 504 stores the block of data temporarily in the SRAM 514. Once the front-end CPU 504 determines that the block of data is successfully stored in the SRAM 514, in step 610 the front-end CPU 504 sends an acknowledgement for the block to the host device 130.

Figure 8C:
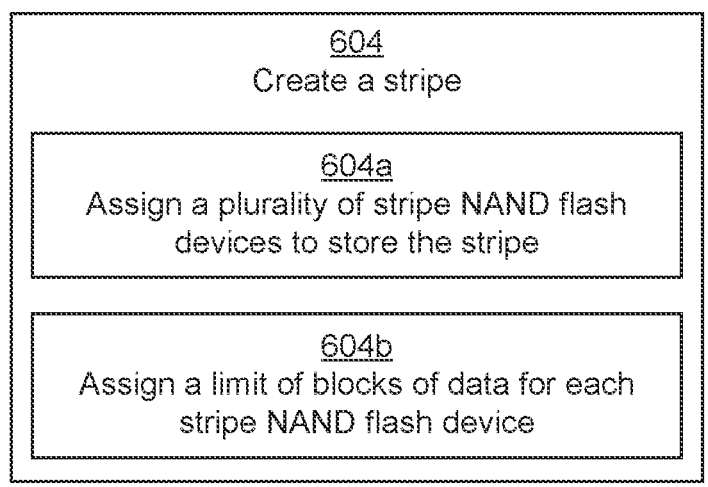

FIG. 8C presents the step 604 of creating the stripe 560 in more detail. In step 604a, the back-end CPU 506 assigns a subset of the plurality of NAND flash devices 524 (or stripe NAND flash devices) into which the blocks of data of the stripe 560 will be stored. In some embodiments, the back-end CPU 506 assigns to the stripe 560 one stripe NAND flash device 524 from each subset 526a-526p of the NAND flash devices 524 of the NAND flash array 550—that is, one stripe NAND flash device 524 per channel 522. In step 604b, the back-end CPU 506 assigns a limit for how many blocks of data will be stored into each stripe NAND flash device 524. In some embodiments, the limit for each stripe NAND flash device 524 is four blocks of data.

Figure 8D:
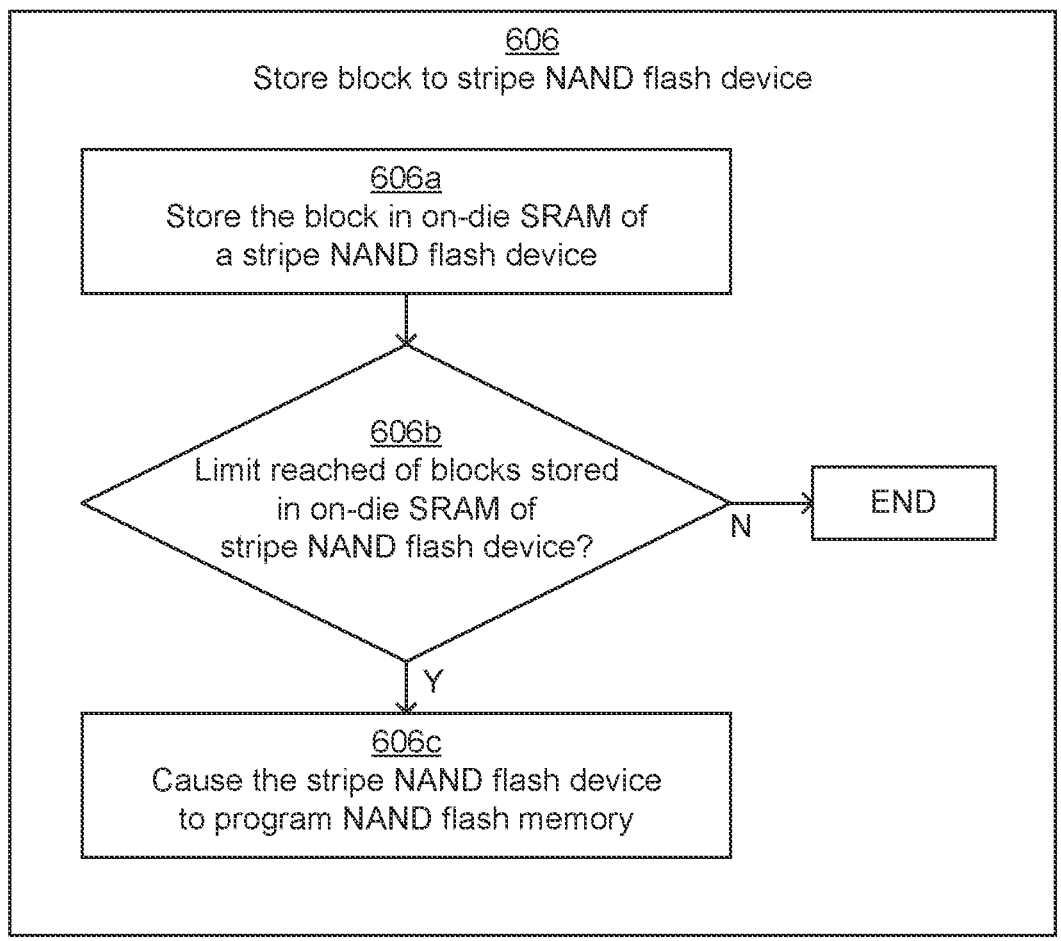

FIG. 8D presents the step 606 of storing the received block of data to one of the NAND flash devices 524 assigned to the stripe 560 in more detail. In step 606a, the back-end CPU 506 stores the received block of data in the on-die SRAM 528 of a stripe NAND flash device 524. In step 606, once the block of data is successfully written into the on-die SRAM 528 of the stripe NAND flash device 524, the main CPU 502 releases the portion of the SRAM 514 in which the block of data is stored for subsequent re-use.

In some embodiments, all received blocks of data are stored to the on-die SRAM 528 of a first stripe NAND flash device 524 until that device's limit of blocks of data have been stored, then all subsequent received blocks of data are stored to the on-die SRAM 528 of a second stripe NAND flash device 524 until that device's limit of blocks of data have been stored, and so on until all the blocks of data of the stripe 560 have been stored to the on-die SRAMs 528 of all of the stripe NAND flash devices 524. In other embodiments, each received block of data is stored to the on-die SRAM 528 of an arbitrary stripe NAND flash device 524 until all the blocks of data of the stripe 560 have been stored to the on-die SRAMs 528 of the stripe NAND flash devices 524 of the stripe 560.

In step 606b, after a received block of data is stored to the on-die SRAM 528 of a stripe NAND flash device 524, the back-end CPU 506 determines whether the limit of blocks of data to be stored to the on-die SRAM 528 of the stripe NAND flash device 524 has been reached. If not, the write operation process 600 ends. If the limit has been reached, in step 606c the NFI CPU 508 causes the stripe NAND flash device 524 to program the blocks of data for the stripe 560 into its NAND flash memory 530.

FIGS. 9A-9D present a more detailed view of the GC process 700 of FIG. 7. In step 702, the back-end CPU 506 prepares garbage collection parameters, as described in more detail in FIG. 9B. In step 704, the garbage collection process is performed according to the parameters prepared in step 702, as described in more detail in FIG. 9C.

Figure 9A:
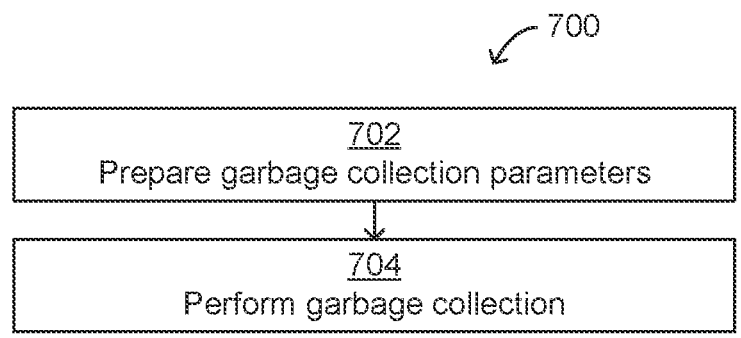
FIGS. 9A-9D present a more detailed view of the GC process of FIG. 7.
Figure 9B:
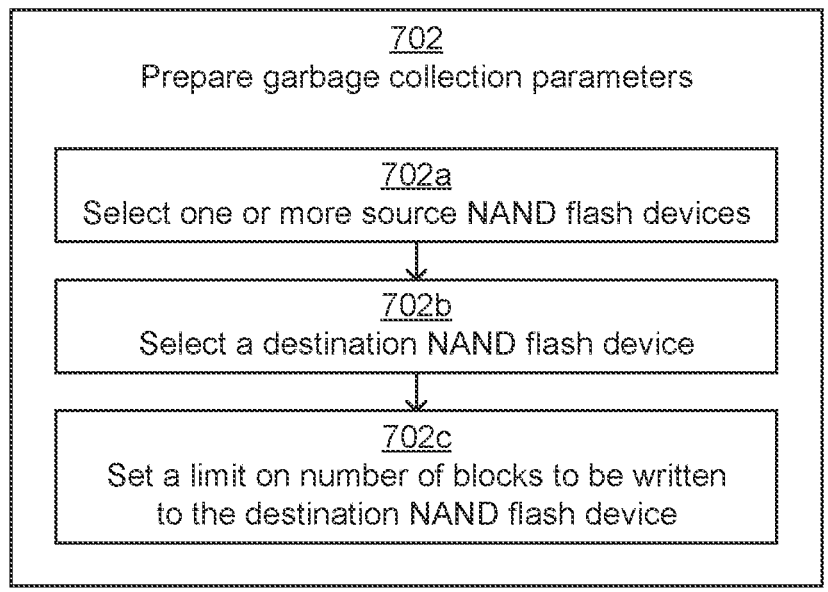

FIG. 9B presents in greater detail the step 702 of preparing the garbage collection parameters. In step 702a, the back-end CPU 506 selects at least one source NAND flash device 524 (or source NAND) from which valid blocks of data are to be read. If a single source NAND flash device 524 does not have a sufficient number of valid blocks of data for a complete GC process 700, the back-end CPU 506 selects additional source NAND flash devices 524 from which to read valid blocks of data, until enough blocks of data for the complete GC process 700 can be read from the selected source NAND flash devices 524. For each selected source NAND flash device 524, the back-end CPU 506 specifies the locations of the valid blocks of data to be read.

In step 702b, the back-end CPU 506 selects a destination NAND flash device 524 (or destination NAND) into which to store the blocks of data. In step 702c, the back-end CPU 506 sets a limit for how many blocks of data can be written to the destination NAND flash device 524. In some embodiments, the limit is set to the number of blocks of data considered sufficient for a complete GC process 700, as used in step 702a. In other embodiments, the limit is set to a number of blocks that is based on a number of blocks the destination NAND flash device 524 has capacity to store.

Figure 9C:
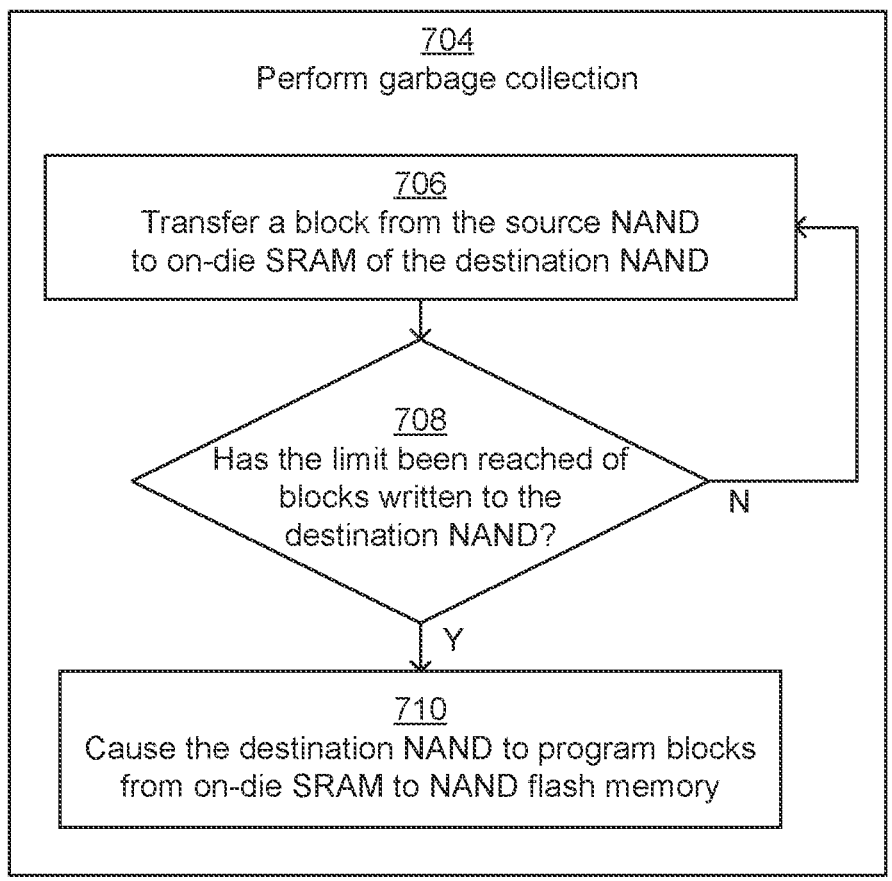

FIG. 9C presents in greater detail the step 704 of performing the garbage collection process. In step 706, a valid block of data is read from a source NAND flash device 524 and written to the on-die SRAM 528 of the destination NAND flash device 524 (as explained in more detail with reference to FIG. 9D). In step 708, a determination is made whether the limit has been reached of the number of blocks of data to be stored in the on-die SRAM 528 of the destination NAND flash device 524. If not, then the process 700 returns to step 706 to read and store another block of data. If the limit has been reached, then in step 710, the NH CPU 508 causes the destination NAND flash device 524 to program the blocks of data from the on-die SRAM 528 into the NAND flash memory 530.

Figure 9D:
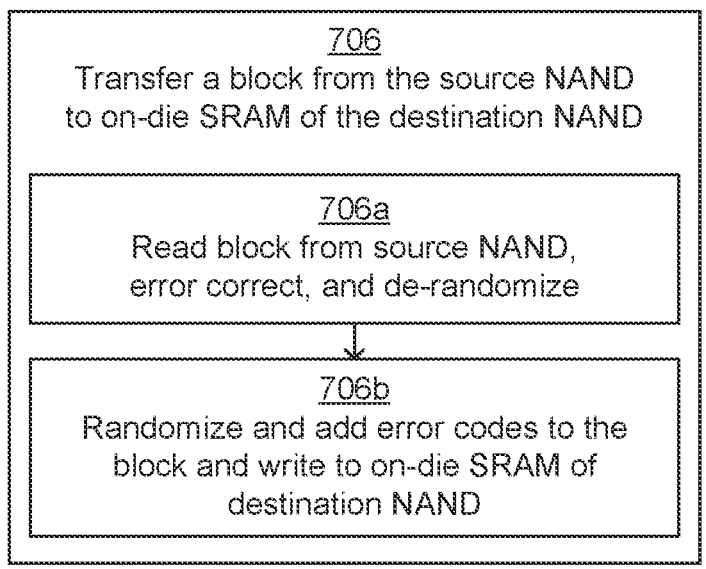

FIG. 9D presents in greater detail the step 706 of reading a block of data from a selected source NAND flash device 524 and writing it to the on-die SRAM 528 of the selected destination NAND flash device 524. In step 706a, the NFI CPU 508 causes a block of data to be read from the specified location in the source NAND flash device 524 and error corrects the block of data using an error correcting circuit of the flash subsystems 520. The NFI CPU 508 then uses the randomizer circuit of the flash subsystems 520 to de-randomize the block of data, using a randomizing key associated with the source NAND flash device 524. In step 706b, the NH CPU 508, using the randomizer circuit of the flash subsystems 520, re-randomizes the de-randomized and error corrected block of data using a randomizing key associated with the selected destination NAND flash device 524, adds error correction codes using the LDPC circuit 542, and causes the resulting block of data to be written to the on-die SRAM 528 of the selected destination NAND flash device 524.

In some embodiments, between steps 706a and 706b, the de-randomized and error corrected blocks are sent to an encryption/decryption engine in the HW Accelerators 516, where they are decrypted and re-encrypted prior to re-randomization by the randomizer 540.

Figure 10:
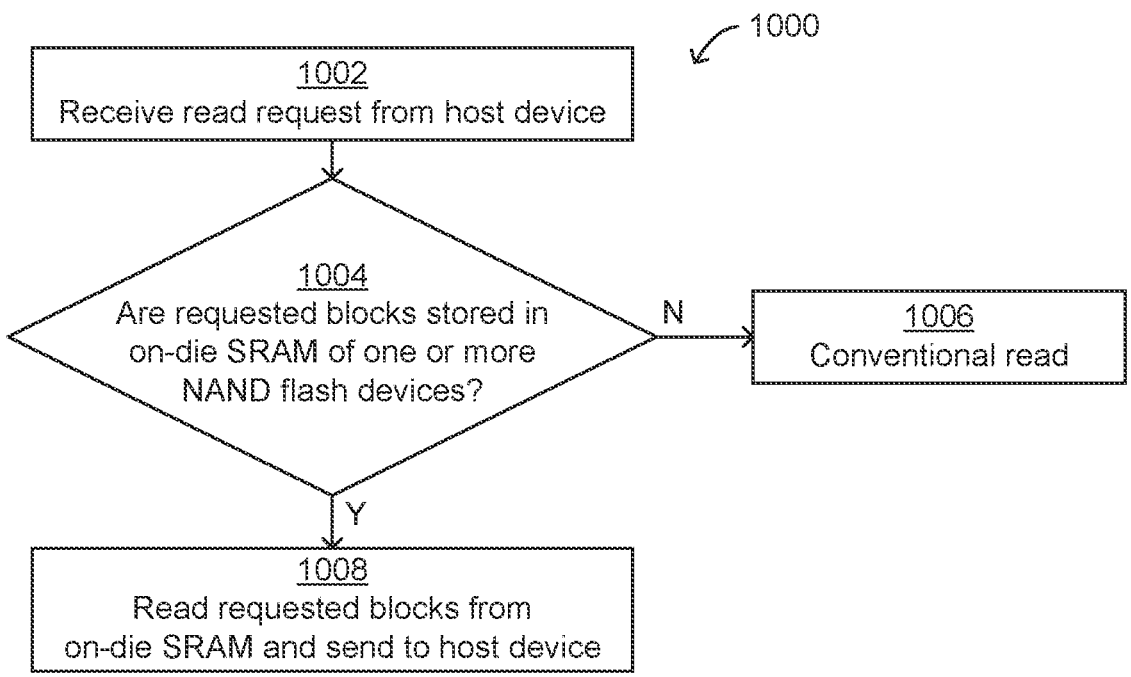
FIG. 10 presents a flow chart of a read operation process according to the disclosure.

FIG. 10 presents a flow chart of a read operation process 1000 according to the disclosure. In step 1002, the SSD 500 receives a read operation request from the host device 130. The read operation request specifies blocks of data to be read and includes a stream identifier for the blocks. In step 1004, the main CPU 502 determines whether the requested blocks of data are part of the stripe 560 that is currently being written to the NAND flash array 550 in an instantiation of the write operation process 600 (i.e., whether the requested blocks of data are stored in on-die SRAMs of one or more stripe NAND flash devices 524). Step 1004 includes determining whether the instantiation of the write operation process 600 has reached the step 608, wherein the portion of the on-die SRAMs 528 storing the blocks of data of the stripe 560 is released and marked for re-use. If the determination is that the blocks of data are not currently being written in the write operation process 600, in step 1006 the main CPU 502 initiates a conventional read operation process to read the requested blocks of data from the NAND flash array 550.

If it is determined in step 1004 that the requested blocks of data are part of the stripe 560 that is currently being written in an instantiation of the write operation process 600, in step 1008 the back-end CPU 506 causes the NFI CPU 508 to read the requested blocks of data from the on-die SRAMs 528 of the stripe NAND flash devices 524 where the blocks of data are stored, then the requested blocks of data are sent to the host device 130. The step 1008 temporarily stores some or all of the requested blocks of data in the SRAM 514 prior to sending the blocks to the host.

During either the write operation process 600 or the GC process 700, if it is sensed in the SSD 500 that a power loss event has occurred, Power Loss Protection (PLP) functionality of the SSD 500 provides that the main CPU 502 causes any NAND flash device 524 having blocks of data stored temporarily in its on-die SRAMs 528 to program the blocks of data into its NAND flash memory 530 to prevent data loss. Once power is restored to the SSD 500, the main CPU 502 causes the blocks of data so stored to be retrieved by the associated NAND flash devices 524 to their on-die SRAMs 528 and performs a power loss recovery process to complete any write operation processes 600 and/or GC processes 700 that were interrupted by the power loss event.

Figure 11:
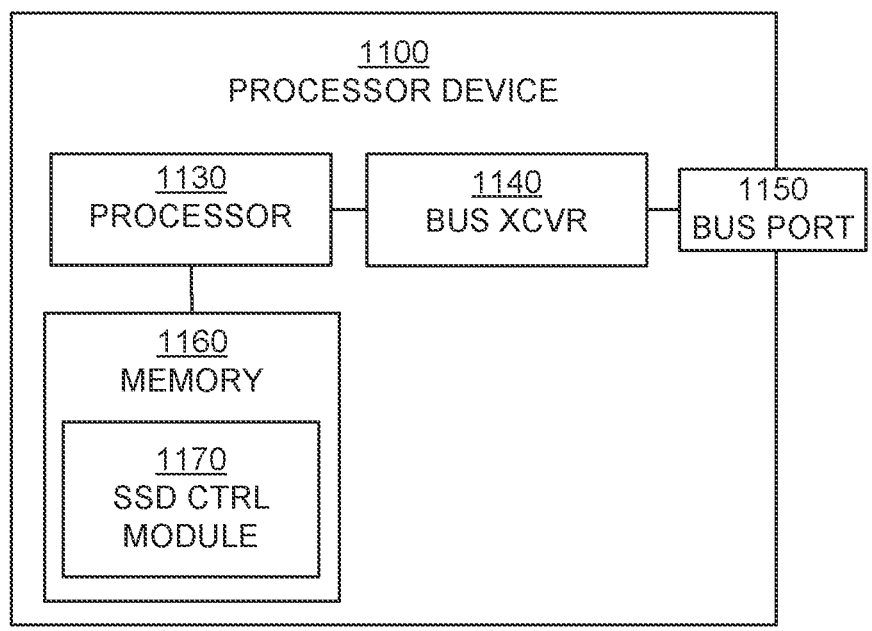
FIG. 11 is a schematic diagram of a processor device according to an embodiment of the disclosure.

FIG. 11 is a schematic diagram of a processor device 1100 according to an embodiment of the disclosure. The processor device 1100 is suitable for implementing the disclosed embodiments as described herein. The processor device 1100 comprises a processor, logic unit, or other suitable processing circuit 1130 to process data; a bus transceiver (XCVR) 1140 and bus port 1150 for sending and receiving the data via a bus such as the Interconnect Network (or bus) 510 shown in FIGS. 6 and 7; and a memory 1160 for storing the data. The processor device 1100 is suitable for implementing the functions described herein performed by the main CPU 502, the front-end CPU 504, the back-end CPU 106, or the NFI CPU 508.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with bus transceiver 1140, bus port 1150, and memory 1160. The processor 1130 comprises a SSD control module 1170. The SSD control module 1170 implements the disclosed embodiments described above. For instance, the SSD control module 1170 performs steps of one or more of of the write operation process 600 and the garbage collection process 700. The inclusion of the SSD control module 1170 therefore provides a substantial improvement to the functionality of the processor device 1100 and effects a transformation of the processor device 1100 to a different state. Alternatively, the SSD control module 1170 is implemented as instructions stored in the memory 1160 and executed by the processor 1130.

The memory 1160 may be used as an over-flow data storage device, to store programs when such programs are selected for execution, and to store instructions and data that are read during program execution. The memory 1160 may be volatile and/or non-volatile and may be read-only memory (ROM), random-access memory (RAM), ternary content-addressable memory (TCAM), and static random-access memory (SRAM).

Figure 12:
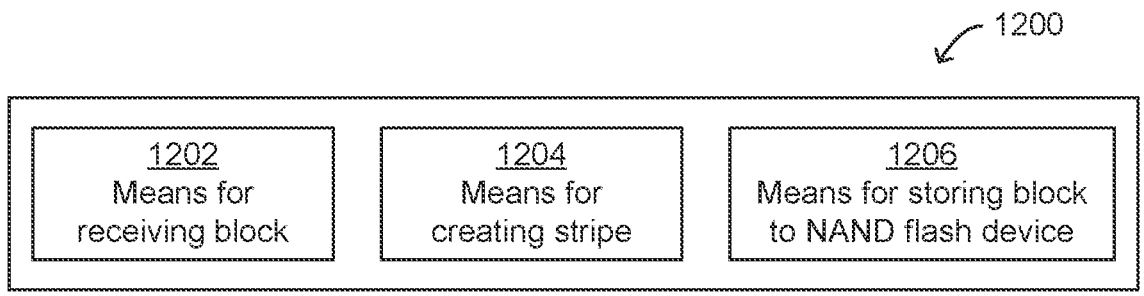
FIG. 12 illustrates an apparatus configured to implement one or more of the methods described herein.

FIG. 12 illustrates an apparatus 1200 configured to implement one or more of the methods described herein such as, for example, the write operation process 600 of FIG. 8A. The apparatus 1200 comprises means 1202 for receiving a block of data from a host device, as described with reference to FIG. 8B; means 1204 for creating a stripe in NAND flash devices of the NAND flash array in which to store the received block of data, as described with reference to FIG. 8C; and means 1206 for storing the received block of data into one of the NAND flash devices assigned to the stripe, as described with reference to FIG. 8D.

Figure 13:
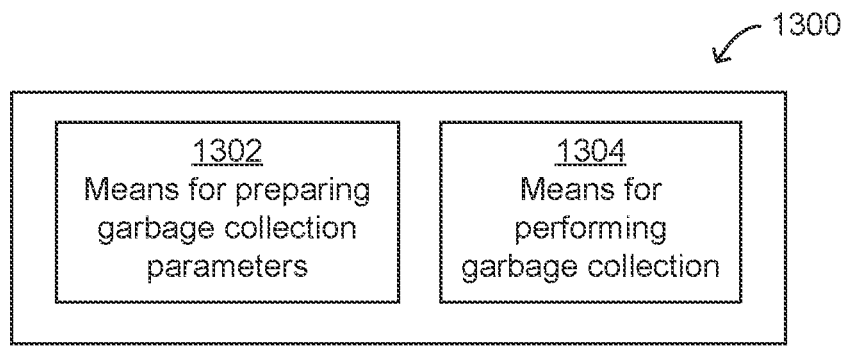
FIG. 13 illustrates an apparatus configured to implement one or more of the methods described herein.

FIG. 13 illustrates an apparatus 1300 configured to implement one or more of the methods described herein such as, for example, the garbage collection process 700 of FIG. 9A. The apparatus 1300 comprises means 1302 for preparing garbage collection parameters, as described with reference to FIG. 9B; and means 1304 for performing the garbage collection process according to the parameters, as described with reference to FIG. 9C.

Figure 14:
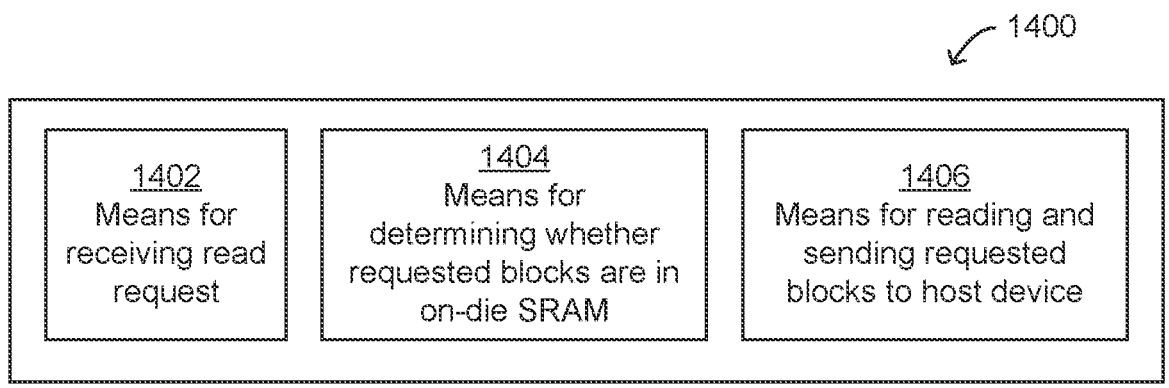
FIG. 14 illustrates an apparatus configured to implement one or more of the methods described herein.

FIG. 14 illustrates an apparatus 1400 configured to implement one or more of the methods described herein such as, for example, the read operation process 1000 of FIG. 10. The apparatus 1400 comprises means 1402 for receiving a read operation request from a host device; means 1404 for determining whether blocks of data specified in the read request are stored in on-die SRAMs of NAND flash devices; and means 1406 for reading the requested blocks of data from the on-die SRAMs and sending the requested blocks of data to the host device.

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A write operation method implemented by a solid state drive (SSD) controller of a SSD having a plurality of Not-AND (NAND) flash devices with on-die Static Random Access Memory (SRAM) and NAND flash memory, the method comprising:
   receiving a block of data from a stream comprising a plurality of blocks of data;
   determining whether a stripe has been created for the stream;
   creating the stripe for the stream based on the determination that the stripe has not been created for the stream, the stripe created by:
      assigning a first subset of the plurality of NAND flash devices to the stripe; and
      setting a limit for how many of the plurality of blocks of data can be stored for the stripe in the on-die SRAM of each of the plurality of NAND flash devices in the first subset;
   storing the block of data for the stripe in the on-die SRAM of one of the NAND flash devices in the first subset;
   determining whether the storing of the block of data in the on-die SRAM of the one of the NAND flash devices caused the limit to be reached; and
   instructing the one of the NAND flash devices to program each block of data stored for the stripe in the on-die SRAM of the one of the NAND flash devices into the NAND flash memory of the one of the NAND flash devices [when] based on the determination that the storing of the block of data in the on-die SRAM of the one of the NAND flash devices caused the limit to be reached.

2. The method of claim 1, further comprising:
causing each of the NAND flash devices in the first subset to mark as available for re-use the on-die SRAM of each of the NAND flash devices in the first subset when all of the NAND flash devices in the first subset have successfully programmed the blocks of data from the on-die SRAM of the NAND flash devices in the first subset into the NAND flash memories of the NAND flash devices in the first subset.

3. The method of claim 1, wherein each block of data from the stream is received from a host device, the method further comprising:
prior to storing the block of data for the stripe in the on-die SRAM of one of the NAND flash devices in the first subset, storing the block of data in a SRAM of the SSD controller;
sending an acknowledgement message to the host device; and
marking as available for re-use the SRAM of the SSD controller that is storing the block of data when the block of data has been stored successfully in the on-die SRAM of the one of the NAND flash devices.

4. The method of claim 1, wherein the stream is a first stream and each block of data from the first stream includes a first stream identifier that identifies the first stream, the method further comprising:
receiving a second block of data from a second stream comprising a second plurality of blocks of data, the second block of data including a second stream identifier that identifies the second stream;
determining whether a second stripe has been created for the second stream;
creating the second stripe for the second stream based on the determination that the second stripe has not been created for the second stream, the second stripe created by:
assigning a second subset of the plurality of NAND flash devices to the second stripe; and
setting a second limit for how many of the second plurality of blocks of data can be stored for the second stripe in the on-die SRAM of each of the plurality of NAND flash devices in the second subset;
storing the second block of data for the second stripe in the on-die SRAM of one of the NAND flash devices in the second subset;
determining whether the storing of the second block of data in the on-die SRAM of the one of the NAND flash devices in the second subset caused the second limit to be reached; and
instructing the one of the NAND flash devices in the second subset to program each block of data stored for the second stripe in the on-die SRAM of the one of the NAND flash devices in the second subset into the NAND flash memory of the one of the NAND flash devices in the second subset based on the determination that the storing of the second block of data in the on-die SRAM of the one of the NAND flash devices in the second subset caused the second limit to be reached.

5. The method of claim 1, further comprising:
receiving a read request from a host device, the read request specifying requested blocks of data to be read;
determining whether the requested blocks of data are stored in on-die SRAMs of one or more of the plurality of NAND flash devices; and
based on the determination that the requested blocks of data are stored in on-die SRAMs of the one or more of the plurality of NAND flash devices:
reading the requested blocks of data from the on-die SRAMs of the one or more of the plurality of NAND flash devices; and
sending the requested blocks of data to the host device.

6. The method of claim 1, further comprising:
causing any NAND flash device of the plurality of NAND flash devices having blocks of data stored in the on-die SRAM to program the blocks of data into the NAND flash memory of the NAND flash device when a power loss event is sensed.

7. A garbage collection (GC) method implemented by a solid state drive (SSD) controller of a SSD having a plurality of Not-AND (NAND) flash devices with on-die Static Random Access Memory (SRAM) and NAND flash memory, the method comprising:
selecting a source NAND flash device from the plurality of NAND flash devices;
selecting a destination NAND flash device from the plurality of NAND flash devices;
setting a limit for how many blocks of data can be written to the destination NAND flash device;
transferring a block of data from the source NAND flash device to the destination NAND flash device by:
reading the block of data from the source NAND flash device; and
storing the block of data in the on-die SRAM of the destination NAND flash device;
determining whether the storing of the block of data in the on-die SRAM of the destination NAND flash device caused the limit to be reached; and
causing the destination NAND flash device to program the blocks of data from the on-die SRAM of the destination NAND flash device into the NAND flash memory of the destination NAND flash device based on the determination that the storing of the block of data in the on-die SRAM of the destination NAND flash device caused the limit to be reached.

8. The method of claim 7, wherein the SSD comprises flash subsystems coupled to the plurality of NAND flash devices, the flash subsystems including a randomizer and an error correction circuit, wherein:
the step of reading the block of data from the source NAND flash device comprises:
creating an error-corrected block of data by error correcting the block of data; and
creating a de-randomized block of data by de-randomizing the error-corrected block of data; and
the step of storing the block of data in the on-die SRAM of the destination NAND flash device comprises storing a processed block of data by:
creating a randomized block of data by randomizing the de-randomized block of data; and
creating the processed block of data by adding error correction codes to the randomized block of data.

9. The method of claim 7, further comprising:
decrypting and re-encrypting the block of data between the step of reading the block of data from the source NAND flash device and the step of storing the block of data in the on-die SRAM of the destination NAND flash device.

10. The method of claim 7, wherein:
the step of selecting the source NAND flash device comprises selecting a plurality of source NAND flash devices; and the step of transferring the block of data from the source NAND flash device to the destination NAND flash device comprises reading subsequent blocks of data from a second source NAND flash device of the plurality of source NAND flash devices when no blocks of data remain on a first source NAND flash device of the plurality of source NAND flash devices.

11. The method of claim 7, further comprising:
specifying locations in the source NAND flash device of the blocks of data to be read from the source NAND flash device; and
reading the blocks of data from the specified locations in the source NAND flash device.

12. The method of claim 7, further comprising:
causing any NAND flash device of the plurality of NAND flash devices having blocks of data stored in the on-die SRAM to program the blocks of data into the NAND flash memory of the NAND flash device when a power loss event is sensed.

13. A solid state drive (SSD) controller of a SSD having a plurality of Not-AND (NAND) flash devices with on-die Static Random Access Memory (SRAM) and NAND flash memory, the SSD controller comprising:
a memory configured to store instructions; and
a processor coupled to the memory and configured to execute the instructions to:
receive a block of data from a stream comprising a plurality of blocks of data;
determine whether a stripe has been created for the stream;
create the stripe for the stream based on the determination that the stripe has not been created for the stream, the stripe created by:
assigning a first subset of the plurality of NAND flash devices to the stripe; and
setting a limit for how many of the plurality of blocks of data can be stored for the stripe in the on-die SRAM of each of the plurality of NAND flash devices in the first subset;
store the block of data for the stripe in the on-die SRAM of one of the NAND flash devices in the first subset;
determine whether the storing of the block of data in the on-die SRAM of the one of the NAND flash devices caused the limit to be reached;
instruct the one of the NAND flash devices to program each block of data stored for the stripe in the on-die SRAM of the one of the NAND flash devices into the NAND flash memory of the one of the NAND flash devices [when] based on the determination that the storing of the block of data in the on-die SRAM of the one of the NAND flash devices caused the limit to be reached.

14. The SSD controller of claim 13, further comprising a SRAM, wherein each block of data from the stream is received from a host device and the processor is configured to execute the instructions to:
prior to storing the block of data for the stripe in the on-die SRAM of one of the NAND flash devices in the first subset, store the block of data in the SRAM of the SSD controller;
send an acknowledgement message to the host device; and
mark as available for re-use the SRAM of the SSD controller that is storing the block of data when the block of data has been stored successfully in the on-die SRAM of the one of the NAND flash devices.

15. The SSD controller of claim 13, wherein the stream is a first stream and each block of data from the first stream includes a first stream identifier that identifies the first stream and the processor is configured to execute the instructions to:
receive a second block of data from a second stream comprising a second plurality of blocks of data, the second block of data including a second stream identifier that identifies the second stream;
determine whether a second stripe has been created for the second stream;
create the second stripe for the second stream based on the determination that the second stripe has not been created for the second stream, the second stripe created by:
assigning a second subset of the plurality of NAND flash devices to the second stripe; and
setting a second limit for how many of the second plurality of blocks of data can be stored for the second stripe in the on-die SRAM of each of the plurality of NAND flash devices in the second subset;
store the second block of data for the second stripe in the on-die SRAM of one of the NAND flash devices in the second subset;
determine whether the storing of the second block of data in the on-die SRAM of the one of the NAND flash devices in the second subset caused the second limit to be reached; and
instruct the one of the NAND flash devices in the second subset to program each block of data stored for the second stripe in the on-die SRAM of the one of the NAND flash devices in the second subset into the NAND flash memory of the one of the NAND flash devices in the second subset based on the determination that the storing of the second block of data in the on-die SRAM of the one of the NAND flash devices in the second subset caused the second limit to be reached.

16. The SSD controller of claim 13, wherein the processor is configured to execute the instructions to:
receive a read request from a host device, the read request specifying requested blocks of data to be read;
determine whether the requested blocks of data are stored in on-die SRAMs of one or more of the plurality of NAND flash devices; and
based on the determination that the requested blocks of data are stored in the on-die SRAMs of the one or more of the plurality of NAND flash devices:
read the requested blocks of data from the on-die SRAMs of the one or more of the plurality of NAND flash devices; and
send the requested blocks of data to the host device.

17. The SSD controller of claim 13, wherein the processor is further configured to perform garbage collection by executing the instructions to:
select a source NAND flash device from the plurality of NAND flash devices;
select a destination NAND flash device from the plurality of NAND flash devices;
set a limit for how many blocks of data can be written to the destination NAND flash device;
transfer a block of data from the source NAND flash device to the destination NAND flash device by:
reading the block of data from the source NAND flash device; and
storing the block of data in the on-die SRAM of the destination NAND flash device;

determining whether the storing of the block of data in the on-die SRAM of the destination NAND flash device caused the limit to be reached; and causing the destination NAND flash device to program the blocks of data from the on-die SRAM of the destination NAND flash device into the NAND flash memory of the destination NAND flash device based on the determination that the storing of the block of data in the on-die SRAM of the destination NAND flash device caused the limit to be reached.

18. The SSD controller of claim 17, wherein the SSD further comprises flash subsystems coupled to the plurality of NAND flash devices, the flash subsystems including a randomizer and an error correction circuit, and the processor is configured to execute the instructions to:

read the block of data from the source NAND flash device by:

creating an error-corrected block of data by error correcting the block of data; and creating a de-randomized block of data by de-randomizing the error-corrected block of data; and store the block of data in the on-die SRAM of the destination NAND flash device by:

creating a randomized block of data by randomizing the de-randomized block of data; and creating a processed block of data by adding error correction codes to the randomized block of data; and storing the processed block of data.

19. The SSD controller of claim 17, wherein the processor is configured to execute the instructions to:

select the source NAND flash device by selecting a plurality of source NAND flash devices; and transfer the block of data from the source NAND flash device to the destination NAND flash device by reading subsequent blocks of data from a second source NAND flash device of the plurality of source NAND flash devices when no blocks of data remain on a first source NAND flash device of the plurality of source NAND flash devices.

20. The SSD controller of claim 17, wherein the processor is configured to execute the instructions to:

cause any NAND flash device of the plurality of NAND flash devices having blocks of data stored in the on-die SRAM to program the blocks of data into the NAND flash memory of the NAND flash device when a power loss event is sensed.

\* \* \* \* \*

UNITED STATES PATENT AND TRADEMARK OFFICE
CERTIFICATE OF CORRECTION

PATENT NO. : 12,254,201 B2
APPLICATION NO. : 17/994884
DATED : March 18, 2025
INVENTOR(S) : Jea Woong Hyun et al.

It is certified that error appears in the above-identified patent and that said Letters Patent is hereby corrected as shown below:

In the Claims

Column 16, Claim 1, Lines 37-67, should read:
1. A write operation method implemented by a solid state drive (SSD) controller of a SSD having a plurality of Not-AND (NAND) flash devices with on-die Static Random Access Memory (SRAM) and NAND flash memory, the method comprising:
 receiving a block of data from a stream comprising a plurality of blocks of data;
 determining whether a stripe has been created for the stream;
 creating the stripe for the stream based on the determination that the stripe has not been created for the stream, the stripe created by:
assigning a first subset of the plurality of NAND flash devices to the stripe; and
setting a limit for how many of the plurality of blocks of data can be stored for the stripe in the on-die SRAM of each of the plurality of NAND flash devices in the first subset;
 storing the block of data for the stripe in the on-die SRAM of one of the NAND flash devices in the first subset;
  determining whether the storing of the block of data in the on-die SRAM of the one of the NAND flash devices caused the limit to be reached; and
  instructing the one of the NAND flash devices to program each block of data stored for the stripe in the on-die SRAM of the one of the NAND flash devices into the NAND flash memory of the one of the NAND flash devices based on the determination that the storing of the block of data in the on-die SRAM of the one of the NAND flash devices caused the limit to be reached.

Column 19, Claim 13, Lines 20-53, should read:
13. A solid state drive (SSD) controller of a SSD having a plurality of Not-AND (NAND) flash devices with on-die Static Random Access Memory (SRAM) and NAND flash memory, the SSD controller comprising:
 a memory configured to store instructions; and
 a processor coupled to the memory and configured to execute the instructions to:
receive a block of data from a stream comprising a plurality of blocks of data;
determine whether a stripe has been created for the stream;

Signed and Sealed this
Thirteenth Day of May, 2025

Coke Morgan Stewart
*Acting Director of the United States Patent and Trademark Office* create the stripe for the stream based on the determination that the stripe has not been created for the stream, the stripe created by:
assigning a first subset of the plurality of NAND flash devices to the stripe; and
setting a limit for how many of the plurality of blocks of data can be stored for the stripe in the on-die SRAM of each of the plurality of NAND flash devices in the first subset;
    store the block of data for the stripe in the on-die SRAM of one of the NAND flash devices in the first subset;
    determine whether the storing of the block of data in the on-die SRAM of the one of the NAND flash devices caused the limit to be reached;
    instruct the one of the NAND flash devices to program each block of data stored for the stripe in the on-die SRAM of the one of the NAND flash devices into the NAND flash memory of the one of the NAND flash devices based on the determination that the storing of the block of data in the on-die SRAM of the one of the NAND flash devices caused the limit to be reached.